United States Patent
Makin et al.

(10) Patent No.: US 12,023,211 B2
(45) Date of Patent: Jul. 2, 2024

(54) DEXTEROUS DENTAL HANDPIECE WITH HAND AND FOOT ACTUATION

(71) Applicant: A.T. STILL UNIVERSITY, Kirksville, MO (US)

(72) Inventors: Inder Raj S. Makin, Mesa, AZ (US); Harry Jabs, Oakland, CA (US)

(73) Assignee: A.T. STILL UNIVERSITY, Kirksville, MO (US)

( * ) Notice: Subject to any disclaimer, the term of this patent is extended or adjusted under 35 U.S.C. 154(b) by 24 days.

(21) Appl. No.: 16/060,650

(22) PCT Filed: Jan. 10, 2018

(86) PCT No.: PCT/US2018/013105
§ 371 (c)(1),
(2) Date: Jun. 8, 2018

(87) PCT Pub. No.: WO2018/132434
PCT Pub. Date: Jul. 19, 2018

(65) Prior Publication Data
US 2021/0161616 A1    Jun. 3, 2021

(51) Int. Cl.
*A61C 1/00* (2006.01)
*A61C 1/05* (2006.01)

(52) U.S. Cl.
CPC .......... *A61C 1/0023* (2013.01); *A61C 1/0038* (2013.01); *A61C 1/052* (2013.01)

(58) Field of Classification Search
CPC ..... A61C 1/0023; A61C 1/0038; A61C 1/052; A61C 1/05; A61C 1/0007; H01H 21/26;
(Continued)

(56) References Cited

U.S. PATENT DOCUMENTS 3,346,958 A    10/1967  Sinatra
4,026,027 A *  5/1977  Kokal, Jr. ............ A61C 1/0007
                                                        433/100
(Continued)

FOREIGN PATENT DOCUMENTS

DE              19832512     *  7/1998   ............. G08C 17/02
WO    WO-2007051628 A1 *  5/2007   ........... A43B 3/0005

OTHER PUBLICATIONS

Machine translation of DE 19832512 (Year: 1998).*
(Continued)

*Primary Examiner* — Heidi M Eide
(74) *Attorney, Agent, or Firm* — Quarles & Brady LLP

(57) ABSTRACT

A dental instrument comprises a fluid driven handpiece in fluid communication with a valve; a source of fluid in fluid communication with the valve; and a controller in electrical communication with the valve and an actuator positioned on the handpiece. The actuator is configured to cause the valve to move between a first position in which fluid cannot flow from the source of fluid to the handpiece and a second position in which fluid flows from the source of fluid to the handpiece thereby driving the handpiece. The dental instrument may further comprise a second actuator in communication with the controller. The second actuator is configured to cause the valve to move between the first position in which fluid cannot flow from the source of fluid to the handpiece and the second position in which fluid flows from the source of fluid to the handpiece thereby driving the handpiece.

36 Claims, 19 Drawing Sheets

(58) Field of Classification Search
CPC ............. H01H 3/14; H01H 2300/01; H01H 2300/014; Y10S 200/02; A43B 3/0005
See application file for complete search history.

(56) References Cited

U.S. PATENT DOCUMENTS

| | | | |
|---|---|---|---|
| 4,373,699 A * | 2/1983 | Leiberich | A61C 17/022 251/129.21 |
| 5,978,548 A * | 11/1999 | Holmstrand | A61M 16/18 128/203.12 |
| 7,422,432 B2 | 9/2008 | Warner | |
| 7,439,463 B2 | 10/2008 | Brenner et al. | |
| 7,659,833 B2 | 2/2010 | Warner et al. | |
| 7,675,430 B2 | 3/2010 | Warner et al. | |
| 7,781,941 B2 | 8/2010 | Horvath et al. | |
| 8,723,668 B1 | 5/2014 | Strohallen et al. | |
| 8,882,503 B2 | 11/2014 | Guaragno | |
| 2001/0045137 A1* | 11/2001 | Birchenough | B60T 10/00 74/335 |
| 2003/0125661 A1 | 7/2003 | Yerushalmy | |
| 2003/0229336 A1 | 12/2003 | Jacobsen et al. | |
| 2006/0134578 A1 | 6/2006 | Schmid | |
| 2006/0264888 A1 | 11/2006 | Moberg et al. | |
| 2007/0031781 A1 | 2/2007 | Warner et al. | |
| 2007/0254261 A1 | 11/2007 | Rosenblood et al. | |
| 2008/0102418 A1* | 5/2008 | Krieger | A61C 1/0015 433/98 |
| 2008/0166685 A1 | 7/2008 | Rosenblood et al. | |
| 2008/0270341 A1* | 10/2008 | Youngblood | A61B 34/25 |
| 2009/0226856 A1 | 9/2009 | Sauter et al. | |
| 2009/0297372 A1 | 12/2009 | Amirouche et al. | |
| 2010/0149323 A1 | 6/2010 | Yoo et al. | |
| 2010/0179541 A1 | 7/2010 | Joseph et al. | |
| 2011/0207990 A1 | 8/2011 | Mersky | |
| 2011/0275027 A1* | 11/2011 | Lint | A61C 1/0015 433/101 |
| 2012/0172677 A1 | 7/2012 | Logan et al. | |
| 2012/0209086 A1 | 8/2012 | Beute | |
| 2012/0308409 A1 | 12/2012 | Levine | |
| 2013/0289760 A1* | 10/2013 | Angerer | G05B 19/19 700/165 |
| 2014/0017629 A1 | 1/2014 | Lint et al. | |
| 2014/0038129 A1 | 2/2014 | Lint et al. | |
| 2014/0120496 A1* | 5/2014 | Rothenwaender | A61C 1/05 433/132 |
| 2015/0157788 A1 | 6/2015 | Gescheit et al. | |
| 2015/0190588 A1 | 7/2015 | Hanson et al. | |
| 2015/0305671 A1 | 10/2015 | Yoon et al. | |
| 2016/0015321 A1 | 1/2016 | Hashemian | |
| 2016/0135698 A1* | 5/2016 | Baxi | A61B 5/7225 600/479 |
| 2017/0100015 A1* | 4/2017 | Mangelberger | A61C 1/088 |
| 2018/0125622 A1* | 5/2018 | Almoumen | A61C 1/0092 |

OTHER PUBLICATIONS

Britannica, The Editors of Encyclopaedia. "rheostat". Encyclopedia Britannica, Dec. 27, 2013, https://www.britannica.com/technology/rheostat. Accessed Jul. 20, 2022.*
Machine translation of WO 2007/051628 (Year: 2007).*
International Search Report and Written Opinion issued in corresponding International Application No. PCT/US2018/013105, mailed Mar. 26, 2018, 14 pages.
D.J. Laser and J.G. Santiago, A Review of Micropumps, Journal of Micromechanical Microengineering, vol. 14 (2004), R35-R64. Internet URL: http://microfluidics.stanford.edu/Publications/Micropumps_Cooling/Laser%20Review%20of%20Micropumps%20in%20JMM.pdf.
Debiotech Switzerland http://www.debiotech.com/ home page with latest news, 3 pages. Retrieved through Wayback Machine website dated May 27, 2013: Internet URL: https://web.archive.org/web/20130527221749/http://debiotech.com/ [retrieved on May 22, 2019].
Debiotech S. A. Switzerland "NANOJECTTM : Successful and Accurate ID injection" 1 page. (Web site of Debiotech's NanojectTM needle array). Retrieved through Wayback Machine website dated Jun. 15, 2013: Internet URL: https://web.archive.org/web/20130615190446/http://nanoject.net/ [retrieved on May 22, 2019].
Machine Translation of claims of DE 19832512, Jul. 20, 1998.

* cited by examiner

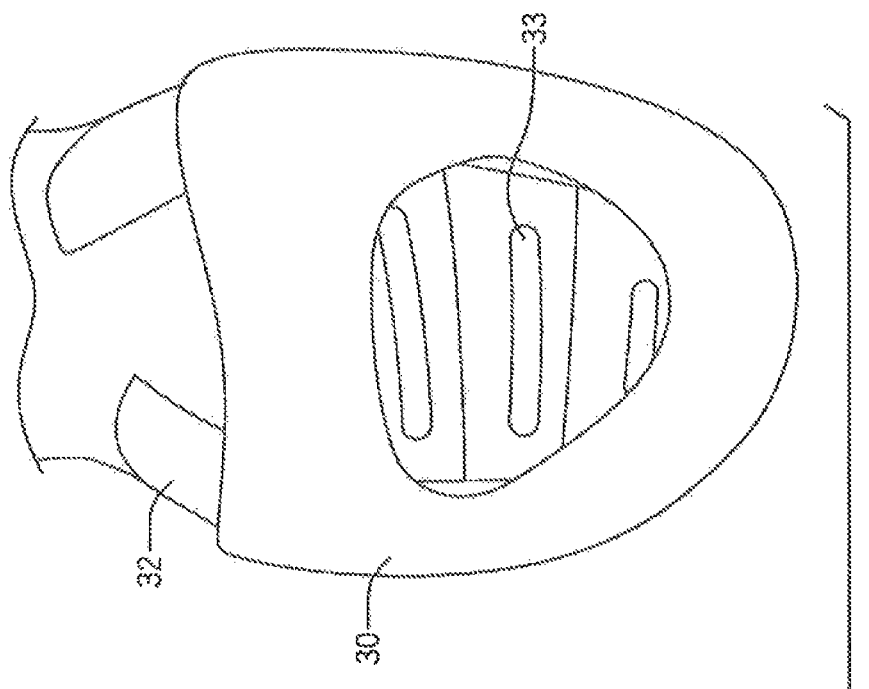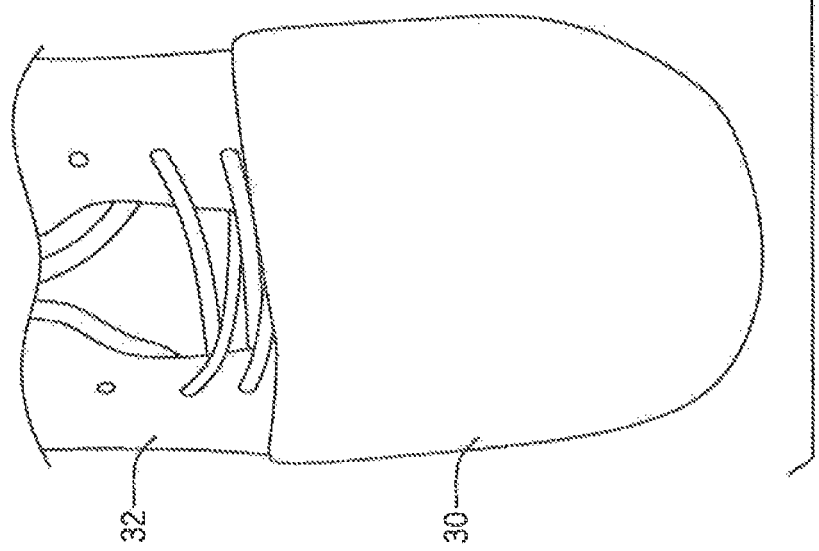
FIG. 6

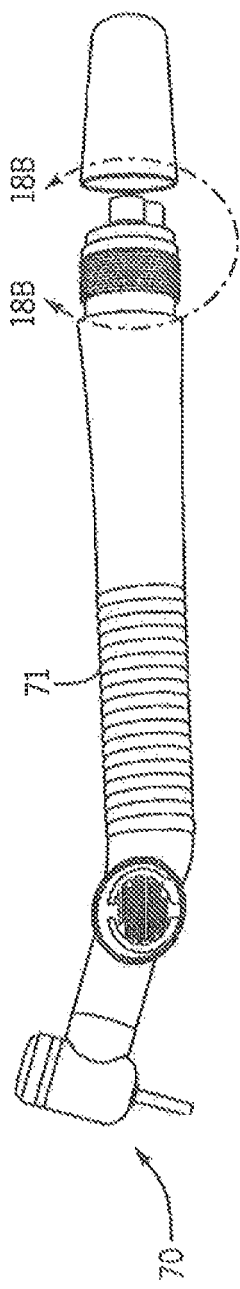
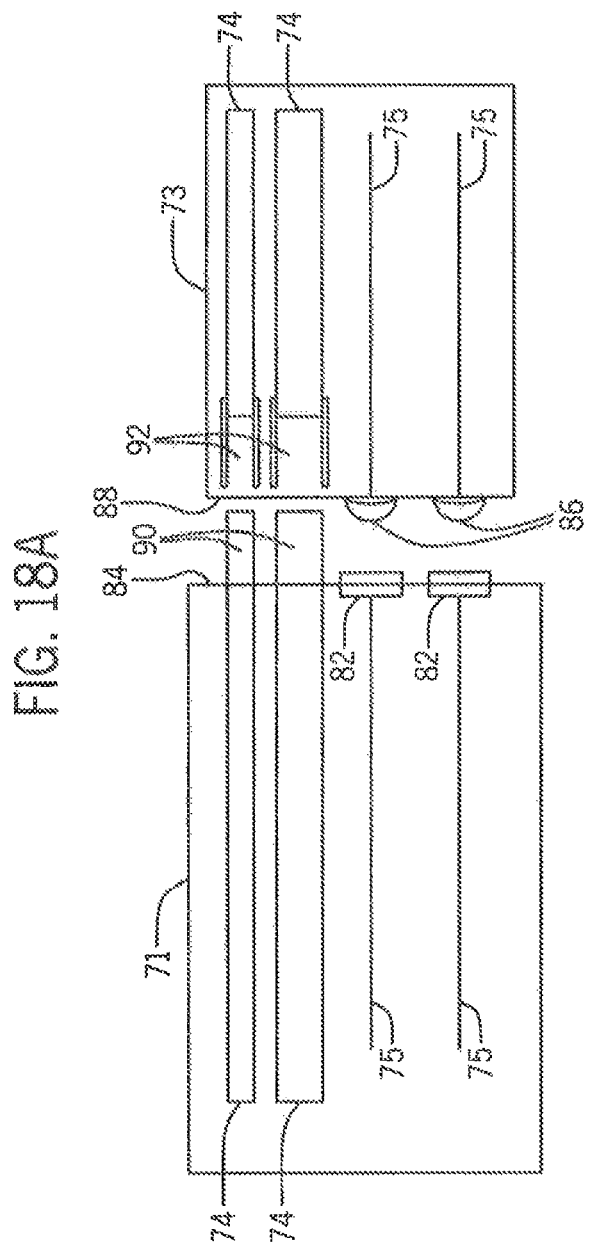
FIG. 18A
FIG. 18B

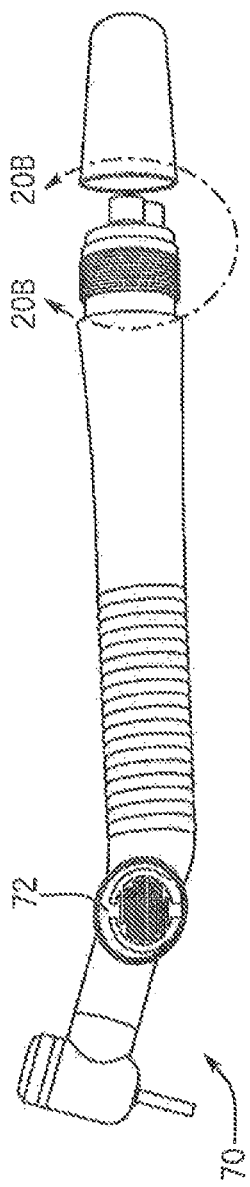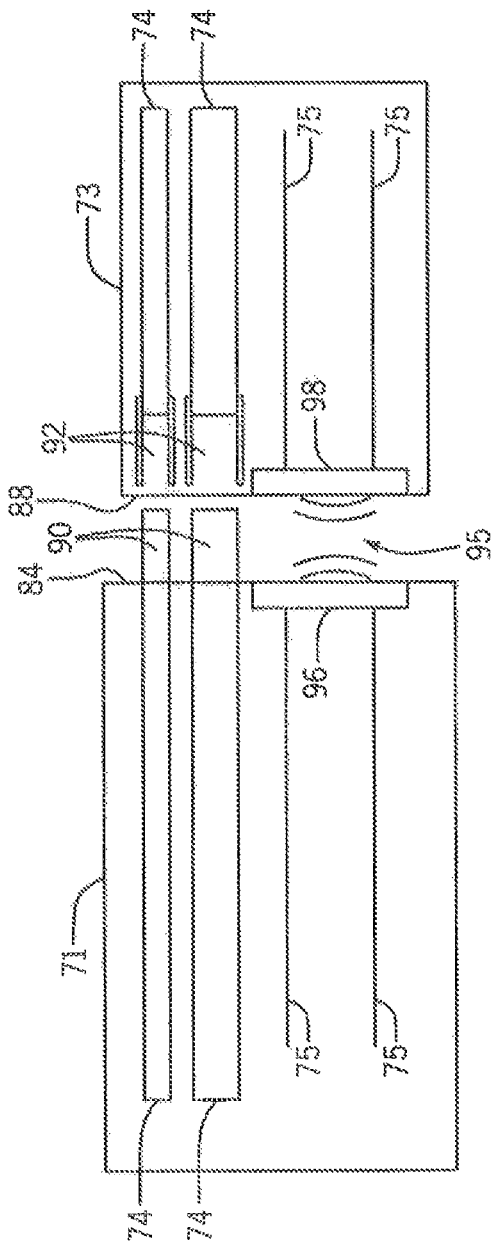

DEXTEROUS DENTAL HANDPIECE WITH HAND AND FOOT ACTUATION

CROSS-REFERENCE TO RELATED APPLICATIONS

This application represents the U.S. National Stage of International Application No. PCT/US2018/013105, filed Jan. 10, 2018 which claims priority to U.S. Provisional Patent Application No. 62/444,672 entitled "Dexterous Dental Handpiece With Finger And Toe Actuation" filed Jan. 10, 2017, which is hereby incorporated by reference in its entirety.

STATEMENT REGARDING FEDERALLY SPONSORED RESEARCH

Not Applicable.

BACKGROUND OF THE INVENTION

1. Field of the Invention

This disclosure relates to a dental handpiece for dexterous operability with hand and foot actuation.

2. Description of the Related Art

Currently, dental drills are actuated by the dental practitioner by means of a foot switch or pedal. This switch is relatively large, positioned in the foot space of the dental practitioner, and has a number of wiring and tubing connections for supply and delivery of compressed air, coolant water and electrical lighting. This design requires the dental practitioner to operate it from a sitting position for most sensitive foot control; whereas when standing the pressure points are not as sensitively felt. If the dental practitioner has to change his position with respect to the patient, the dental practitioner may also have to reposition the foot switch.

What is needed therefore is a dental handpiece with hand as well as foot control that provides for unfettered control through the elimination of the traditional foot switch needed for dental drills.

SUMMARY OF THE INVENTION

The present disclosure provides a dental handpiece for dexterous operability with hand and foot operation. Non-limiting examples of which are finger and toe actuation, toe and heel operation, finger and heel operation, among others. In one embodiment, the dental handpiece includes a pneumatic dental drill system in which the traditional foot switch is eliminated. One actuating sensor can be located at the handpiece and a second actuating sensor with wireless transmitter can be placed at the tip or heel of the dental practitioner's shoe to produce independent signals that are processed in an electronic controller. The controller then drives an actuator that controls the airflow to the handpiece. The sensors may be operated separately or simultaneously. The pressure points threshold, or sensor sensitivity, can be adjusted to best suit the dental practitioner. The sensors can be ambidextrous.

According to some embodiments, the disclosure provides a dental instrument comprising a fluid driven handpiece in fluid communication with a valve, a source of fluid in fluid communication with the valve, and a controller in electrical communication with the valve and an actuating sensor positioned on the handpiece. The sensor may be configured to cause the valve to move between a first position in which fluid cannot flow from the source of fluid to the handpiece and a second position in which fluid flows from the source of fluid to the handpiece thereby driving the handpiece. The dental instrument may further comprise a second actuating sensor in communication with the controller. The second sensor may be configured to cause the valve to move between the first position in which fluid cannot flow from the source of fluid to the handpiece and the second position in which fluid flows from the source of fluid to the handpiece thereby driving the handpiece.

According to some embodiments, the disclosure provides a dental instrument comprising a fluid driven handpiece in fluid communication with a metering valve, a source of fluid in fluid communication with the metering valve, and a controller in electrical communication with the metering valve and an actuating sensor positioned on the handpiece. The actuating sensor may be configured to cause the metering valve to move between a first position in which fluid cannot flow from the source of fluid to the handpiece and a second position in which fluid flows freely from the source of fluid to the handpiece and between one or more intermediate positions where the fluid flows more or less freely thereby driving the handpiece at different speeds. The dental instrument may further comprise a second actuating sensor in communication with the controller. The second actuating sensor may be configured to cause the metering valve to move between the first position in which fluid cannot flow from the source of fluid to the handpiece and the second position in which fluid flows freely from the source of fluid to the handpiece and between one or more intermediate positions where the fluid flows more or less freely thereby driving the handpiece at different speeds.

In some embodiments, one or more supply lines and one or more electrical wires may be positioned within the fluid driven handpiece. An umbilical may be configured to receive one or more supply lines and one or more electrical wires, the umbilical selectively attachable to a distal end of the fluid driven handpiece. The one or more supply lines and one or more electrical wires of the fluid driven handpiece may be selectively attachable to the one or more supply lines and one or more electrical wires of the umbilical. In some embodiments, the one or more electrical wires of the fluid driven handpiece are selectively attachable to the one more electrical wires of the umbilical via stationary contact pads on a distal face of the fluid driven handpiece and contact bumps on the proximal face of the umbilical. The one or more electrical wires of the fluid driven handpiece may be selectively attachable to the one more electrical wires of the umbilical via a transmitter coil of the fluid driven handpiece and a receiver coil of the umbilical.

In some embodiments, the second actuating sensor may be in wireless communication with the controller. The second actuating sensor may comprise a wireless device dimensioned to be secured to a toe or heel of a shoe. The wireless device may comprise a pressure sensor in electrical communication with a transmitter. The wireless communication may be using a secure wireless communication protocol such as IEEE 802.11 a/b/g/n using encryption for security and safety.

According to some embodiments, the disclosure provides a fluid driven handpiece in fluid communication with a valve, a source of fluid in fluid communication with the valve, a controller in electrical communication with the valve and an actuating sensor. The actuating sensor may comprise a wireless device dimensioned to be secured to a toe or heel of a shoe, and the actuating sensor may be configured to cause the valve to move between a first position in which fluid cannot flow from the source of fluid to the handpiece and a second position in which fluid flows from the source of fluid to the handpiece thereby driving the handpiece and optionally between one or more intermediate positions where the fluid flows at different speeds thereby driving the handpiece at different speeds. The wireless device may comprise a pressure sensor in electrical communication with a transmitter that communicates a signal proportional to the exerted pressure. The wireless communication may be using a secure wireless communication protocol such as IEEE 802.11 a/b/g/n using encryption for security and safety.

According to some embodiments, the disclosure provides a fluid driven handpiece in fluid communication with a valve, a source of fluid in fluid communication with the valve, a controller in electrical communication with the valve and an actuating sensor positioned on the handpiece, a second actuating sensor in communication with the controller, the second actuating sensor being configured to cause the valve to move between the first position in which fluid cannot flow from the source of fluid to the handpiece and the second position in which fluid flows from the source of fluid to the handpiece thereby driving the handpiece and optionally between one or more intermediate positions where the fluid flows at different speeds thereby driving the handpiece at different speeds, one or more supply lines and one or more electrical wires positioned within the fluid driven handpiece, an umbilical configured to receive one or more supply lines and one or more electrical wires, the umbilical selectively attachable to a distal end of the fluid driven handpiece. The controller may control the actuator of the valve electromagnetically, and the actuator may be configured to cause the valve to move between a first position in which fluid cannot flow from the source of fluid to the handpiece and a second position in which fluid flows from the source of fluid to the handpiece thereby driving the handpiece. The actuator of the valve may be a solenoid coil that actuates the valve.

Additionally, the fluid driven handpiece may be in fluid communication with a metering valve, a source of fluid in fluid communication with the metering valve, and a controller in electrical communication with the metering valve and an actuating sensor positioned on the handpiece. The actuating sensor may be configured to cause the metering valve to move between a first position in which fluid cannot flow from the source of fluid to the handpiece and a second position in which fluid flows freely from the source of fluid to the handpiece and optionally between one or more intermediate positions where the fluid flows more or less freely thereby driving the handpiece at different speeds. The dental instrument may further comprise a second actuating sensor in communication with the controller. The second actuating sensor may be configured to cause the metering valve to move between the first position in which fluid cannot flow from the source of fluid to the handpiece and the second position in which fluid flows freely from the source of fluid to the handpiece and optionally between one or more intermediate positions where the fluid flows more or less freely thereby driving the handpiece at different speeds. The one or more supply lines and one or more electrical wires of the fluid driven handpiece may be selectively attachable to the one or more supply lines and one or more electrical wires of the umbilical.

It is therefore an advantage of the disclosure to provide a dental handpiece for dexterous operability with hand and foot actuation.

These and other features, aspects, and advantages of the present disclosure will become better understood upon consideration of the following detailed description, drawings and appended claims.

BRIEF DESCRIPTION OF THE DRAWINGS

FIG. 6 shows an elastic cycling toe cover slipped over a dental practitioner's shoe, top (left) and bottom (right) view. The main pressure point of the sole remains uncovered for comfort and safety. It can come in a one-size-fits-all format.

FIGS. 18A and 18B show a schematic depiction of a dental handpiece for dexterous operability with hand and foot actuation according to another example embodiment of the disclosure.

FIGS. 20A and 20B show a schematic depiction of a dental handpiece for dexterous operability with hand and foot actuation according to another example embodiment of the disclosure.

Like reference numerals will be used to refer to like parts from Figure to Figure in the following description of the drawings.

DETAILED DESCRIPTION OF THE INVENTION

Figure 1:
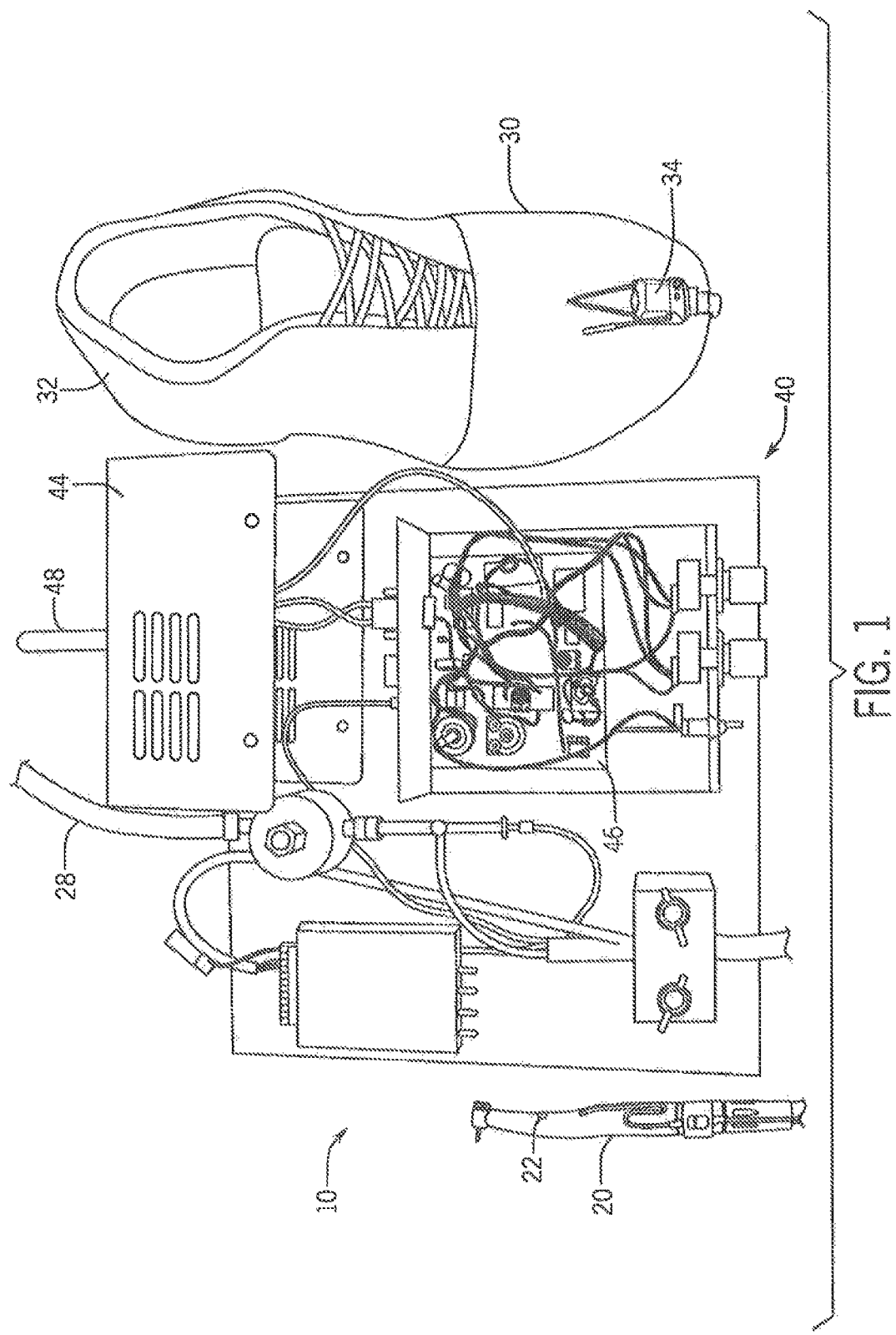
FIG. 1 shows an actual prototype system overview with breadboard base station, drill with finger sensor, and shoe with exemplary wireless toe sensor for an example embodiment of the disclosure.

An overview of the system components of a non-limiting example embodiment of the disclosure is shown in FIG. 1. The system 10 includes a pneumatic drill 20 retrofitted with a detachable finger pressure sensor 22 (left), an exemplary toe cover 30 slipped over a shoe 32 and having the pressure sensor 34 with a wireless transmitter 36 attached via Velcro® (right) and a breadboard with base station controller, actuator valve, lighting unit and tubing and electrical interconnects (center). The base station 40 has the cover 44 removed to expose the electronic board 46 inside. The RF antenna 48 to communicate with the shoe transmitter is mounted on top of the metal cover. The system is supplied with compressed air of approximately 30 psi pressure, optional coolant water, 12 VDC/1 A electrical power to the base station, 9 VDC/2 A electrical power to the lighting unit, and a CR2450 coin battery for the toe sensor. The toe cover 30 could be modified to cover the heel of a subject to be used for heel activation as well.

Figure 2:
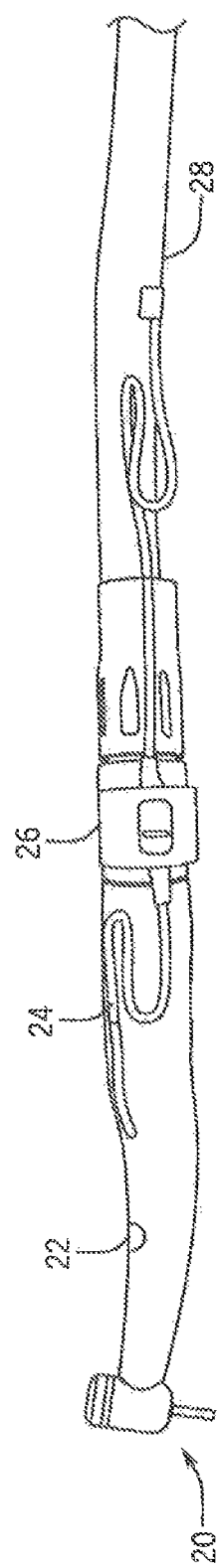
FIG. 2 shows a dental drill with detachable finger pressure sensor according to an example embodiment of the disclosure. The "S" loops are cable strain reliefs to allow for rotational movement (left loop) and tube flexing (right loop). The thin coaxial cable is run through the large air lumen still allowing ample air flow. A stainless steel clip holds the connector tightly to the handpiece.
Figure 3:
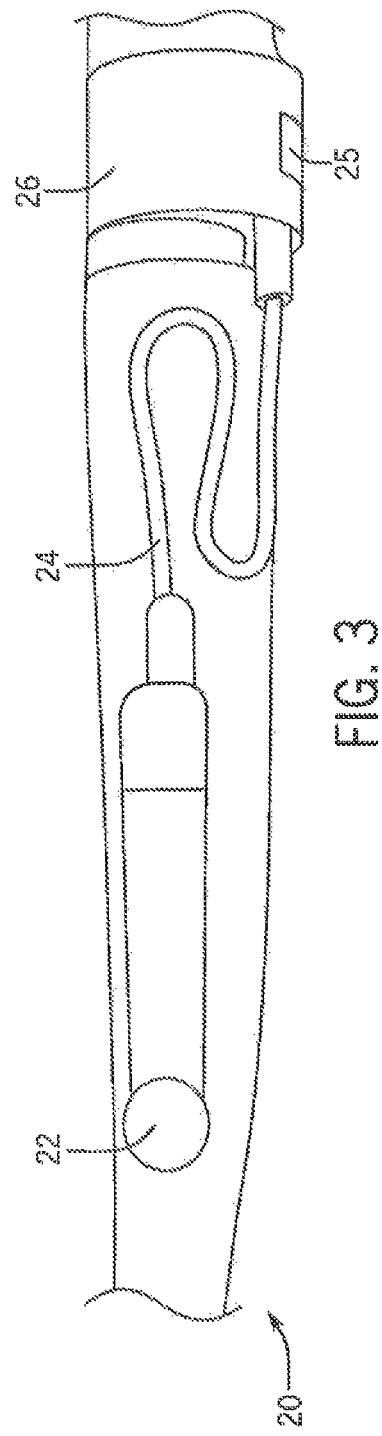
FIG. 3 shows a detachable finger pressure sensor tied to dental drill of FIG. 2.
Figure 4:
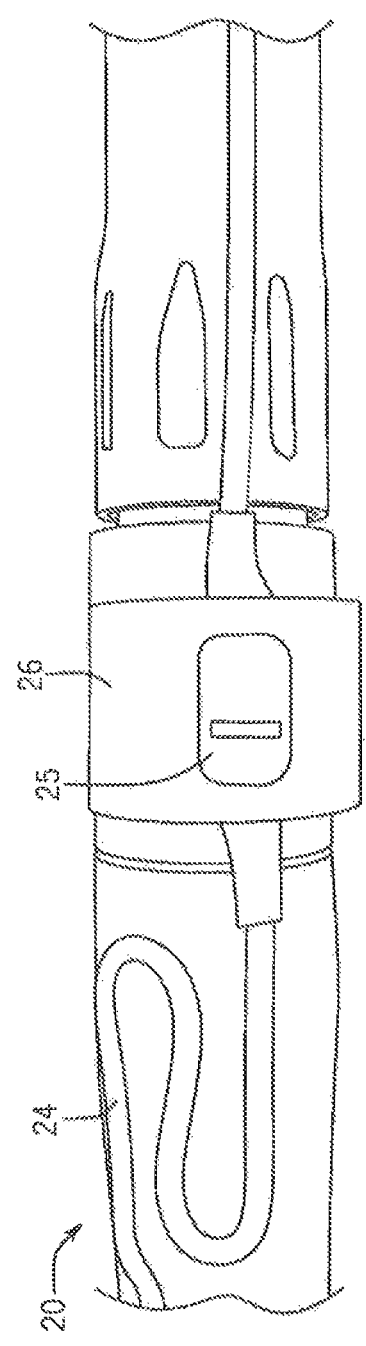
FIG. 4 shows a stainless steel clamp on dental drill to hold the connector tightly to the handpiece of FIG. 2.
Figure 5:
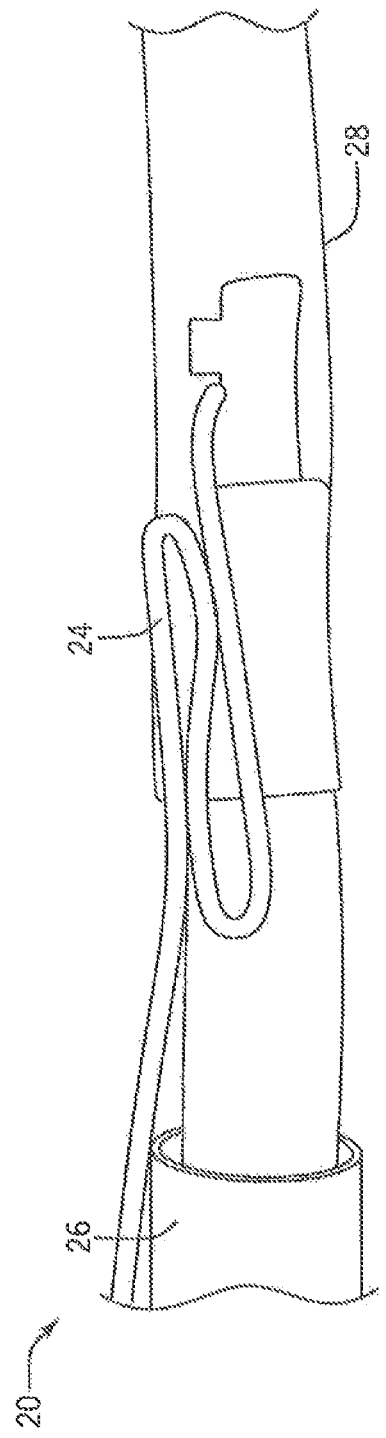
FIG. 5 shows a coaxial sensor cable inserted into air lumen of tubing through a modified coupling still allowing air flow for the dental drill of FIG. 2.

A pneumatic turbine drill can be used and a detachable pressure sensitive resistor can be clamped to the handpiece. In FIG. 2, there is shown the handpiece 20 with pressure sensor 22, the connecting cable 24 that is incorporated into the large air lumen of the supply tubing and a connector 25 with custom-made stainless steel clip 26 to hold the connector and cable tightly against the drill. The pressure sensor 22 is attached to the handpiece 20 with short sections of transparent shrink tubing. Alternatively, the shrink tubing can be replaced with custom-made stainless steel clips. As long as the sensor 22 is attached to the exterior of the handpiece, the sensor 22 is preferably detachable for autoclaving of the drill. Alternatively, the sensor can be incorporated into the handpiece under a thinned-out area of the handpiece housing. In this alternative embodiment, there will be no cable external of the drill and the electrical connections can be made via the standard handpiece connector. The S-shaped loops of the cable 24 are strain relief features to allow limited twisting of the handpiece against the tubing. The cable 24 is a special coaxial cable with a polytetrafluoroethylene (e.g., Teflon®) cable jacket to reduce friction. The stainless steel clamp 26 has a cutout that is shaped such that the cable connector will be held together, in essence serving as a detent. The sensitive area of the pressure sensor 22 is positioned on the handpiece axially and radially such that a right-handed dental practitioner will have the most ergonomic control of the switch. For a left-handed dental practitioner, the sensor 22 may be repositioned as needed. A close-up of the pressure sensor is shown in FIG. 3, a close-up of the connector clamp 26 is shown in FIG. 4, and a close-up of the cable insertion into the air lumen 28 of the tubing is shown in FIG. 5.

An alternative dental drill actuation mode through foot operation was realized freeing the finger of the dental practitioner. Also, since most dental practitioners are trained to use their foot to operate the drill, this option offers the dental practitioner a familiar but advanced actuation method, acting as a go-between to the as-of-yet unfamiliar finger actuation.

Figure 7:
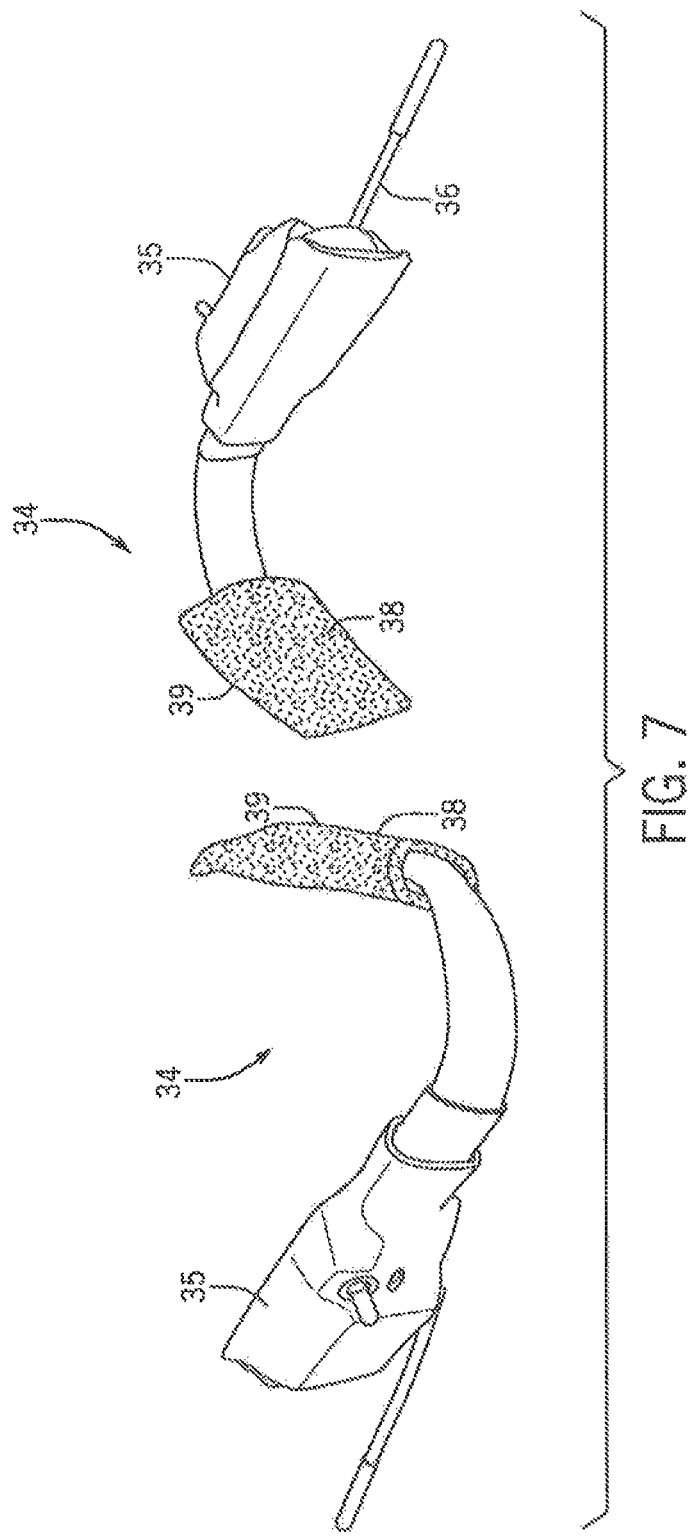
FIG. 7 shows perspective views of a detachable toe pressure sensor with wireless transmitter. The sensor is attached to the dental practitioner's shoe with a strip of hook and loop fastener material such as that sold under the tradename Velcro®.
Figure 8:
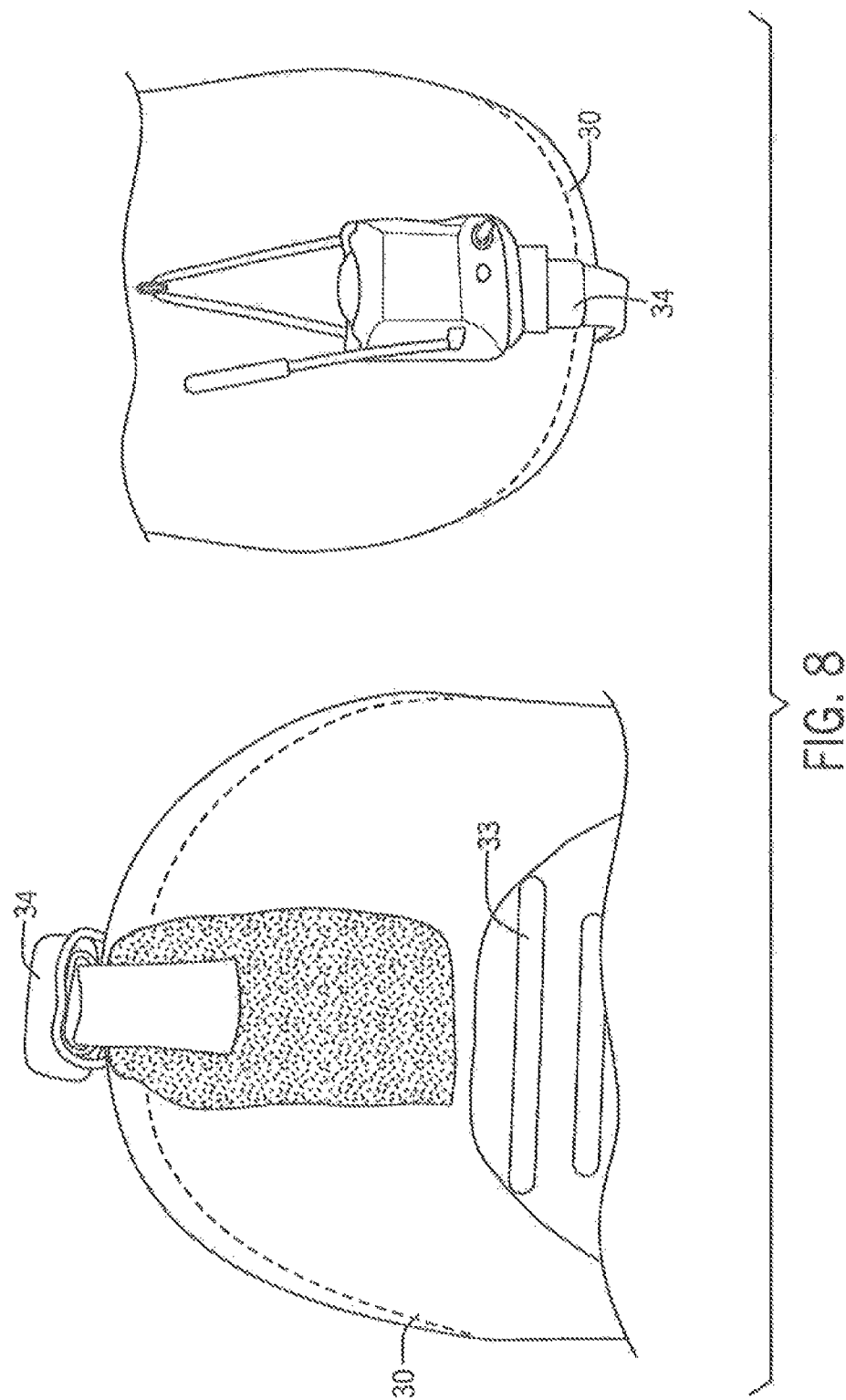
FIG. 8 shows the toe pressure sensor with wireless transmitter of FIG. 7 attached to the dental practitioner's shoe with a Velcro® strip and rubber band.

To maintain an advantage of the present disclosure of avoiding the large foot switch with its many connections, the foot pressure sensor was designed as a small, detachable, wireless device 34 that can be ergonomically positioned in the toe area of the dental practitioner's foot. In some embodiments, the wireless device 34 can be ergonomically positioned in the heel area of the dental practitioner's foot as well. The wireless device 34 attaches to a toe or heel cover 30 that is slipped over the dental practitioner's shoe 32 as shown in FIG. 6. The main pressure point of the sole 33 remains uncovered for comfort and safety. The attachment is made with Velcro® strips to allow optimal positioning of the pressure sensor for best ergonomic operation. In FIG. 7, the compact and self-contained wireless device is shown. The transmitter, associated electronics, and battery compartment are densely packed around a double-sided printed circuit board. The wireless device 34 is ruggedized by two layers of black shrink tubing 35 with cutouts for protrusions of the whip antenna, an on-off switch, and a cutout for a red LED light (just below the toggle lever) to indicate that the wireless device is powered on. In addition to LED light at toe or heel sensor operation, a vibratory feedback device is included to indicate the activation of the toe or heel sensor to the user. The on-off switch can be chosen to be a "hard" switch, meaning that in the off position zero current is flowing to prevent battery drain. The battery easily slides in-and-out of the battery compartment and yet is held firmly in place by spring-loaded contacts. The pressure sensor 39 is beneath the Velcro® strip 38 with its sensitive area approximately in the center of the strip 38. The Velcro® serves also to ruggedize by protecting the sensor. The nearly half-circular pre-shaped transparent shrink tubing contains the electrical connection and affords a relatively stiff but flexible connection between the sensor and the transmitter electronics. It is shaped to conform to the curvature of the tip of a shoe 32 and is slightly over-bent to provide a snug adherence to the shoe surface. The transmitter 36 can be affixed even tighter to the shoe by applying a rubber band 37 as shown in FIG. 8. The range of the transmitter can be approximately 50 feet.

Figure 9:
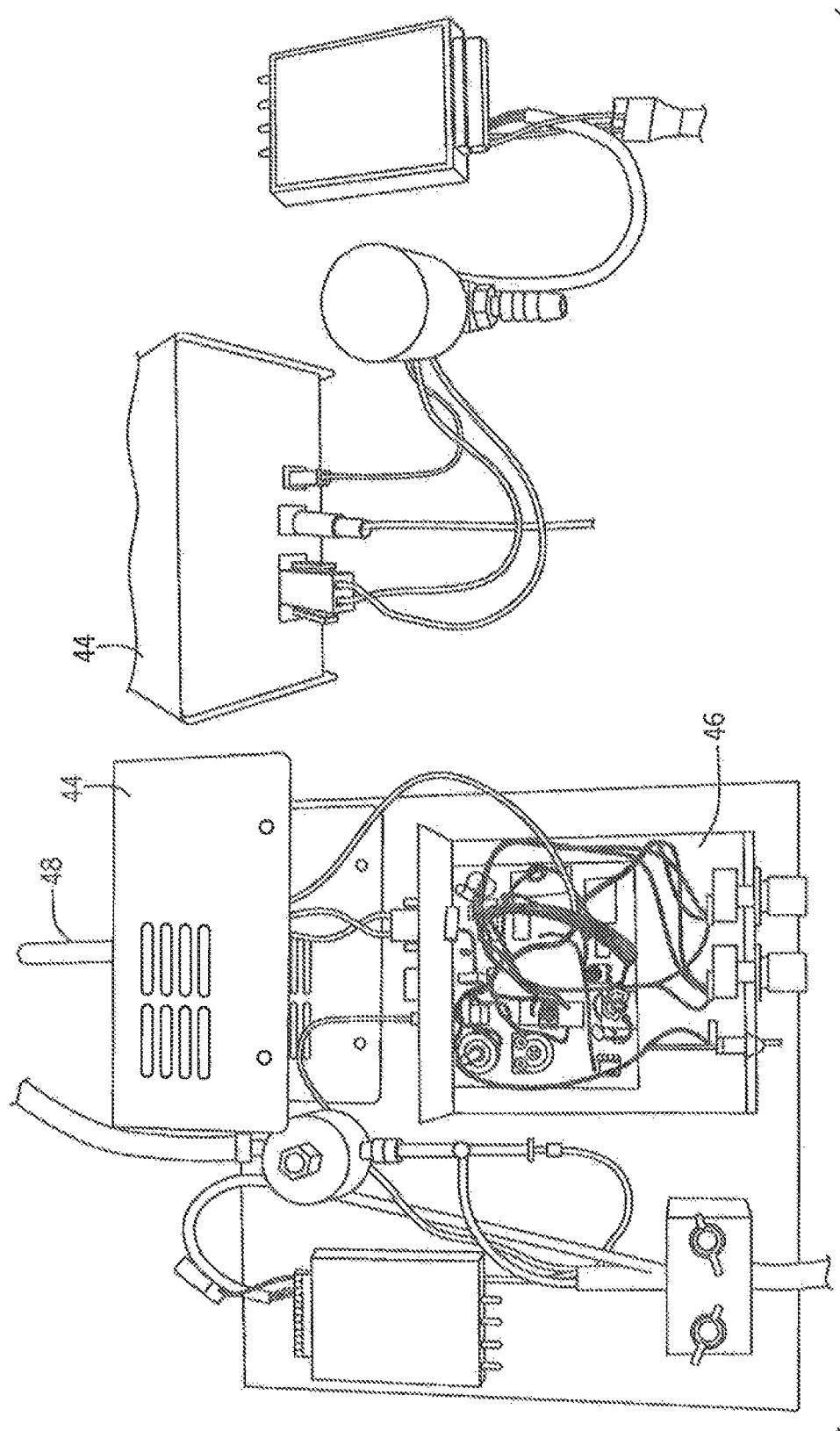
FIG. 9 shows a prototype system breadboard front (left) and back view (right) according to an example embodiment of the disclosure showing the arrangement of a base station, air valve, light delay circuit and tubing clamp. The base station's cover has been opened in the left view to show the electronics inside.

In FIG. 9, there is shown the prototype breadboard with the arrangement of the stationary system components of an example embodiment of the disclosure. The main components mounted to the board are the base station control electronics 46, the air actuator valve, and the lighting power supply. In the front, there is a wooden clamp to firmly hold the tubing to the dental drill in place. The main electronics box with its front panel controls is placed next to the clamp. In the back, there are ports and connections for the supply of DC power, compressed air, and coolant water.

Figure 10:
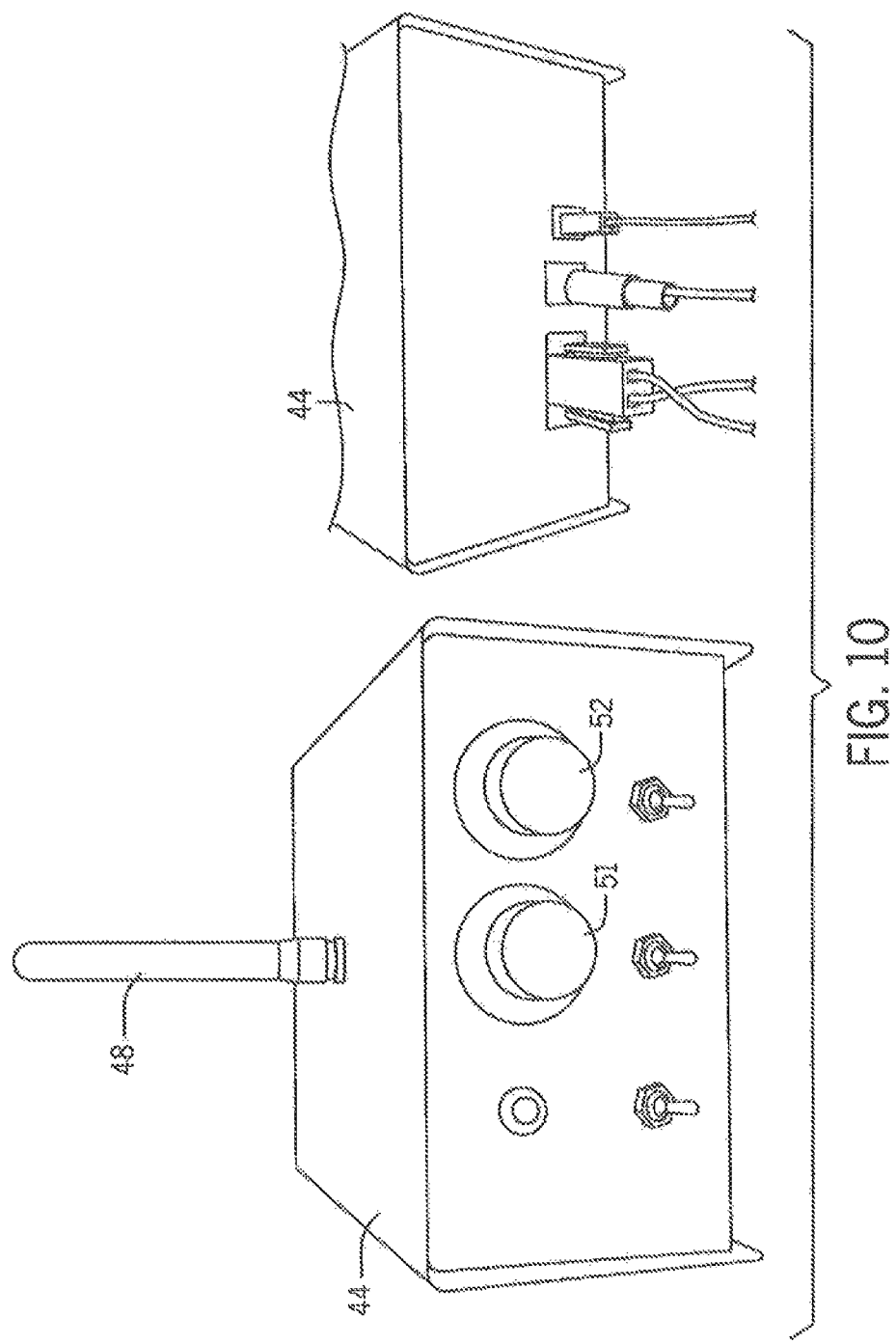
FIG. 10 shows the base station front (left) and rear panel (right) of the system of FIG. 9. The dental practitioner adjusts the pressure sensitivity independently for the finger and toe or heel sensors. All electrical connections can be made in the back. A 900 MHz whip antenna is mounted on the enclosure.

In FIG. 10, there is shown the front and back panels of the electronics box with main power switch, LED power indicator, and two independent sensitivity adjustments 51, 52, for the hand sensor and the foot sensor, respectively. Each sensor may be enabled or disabled with toggle switches with all combinations possible. A 900 MHz whip antenna 48 is mounted on top of the metal electronics enclosure for unimpeded RF reception.

Figure 11:
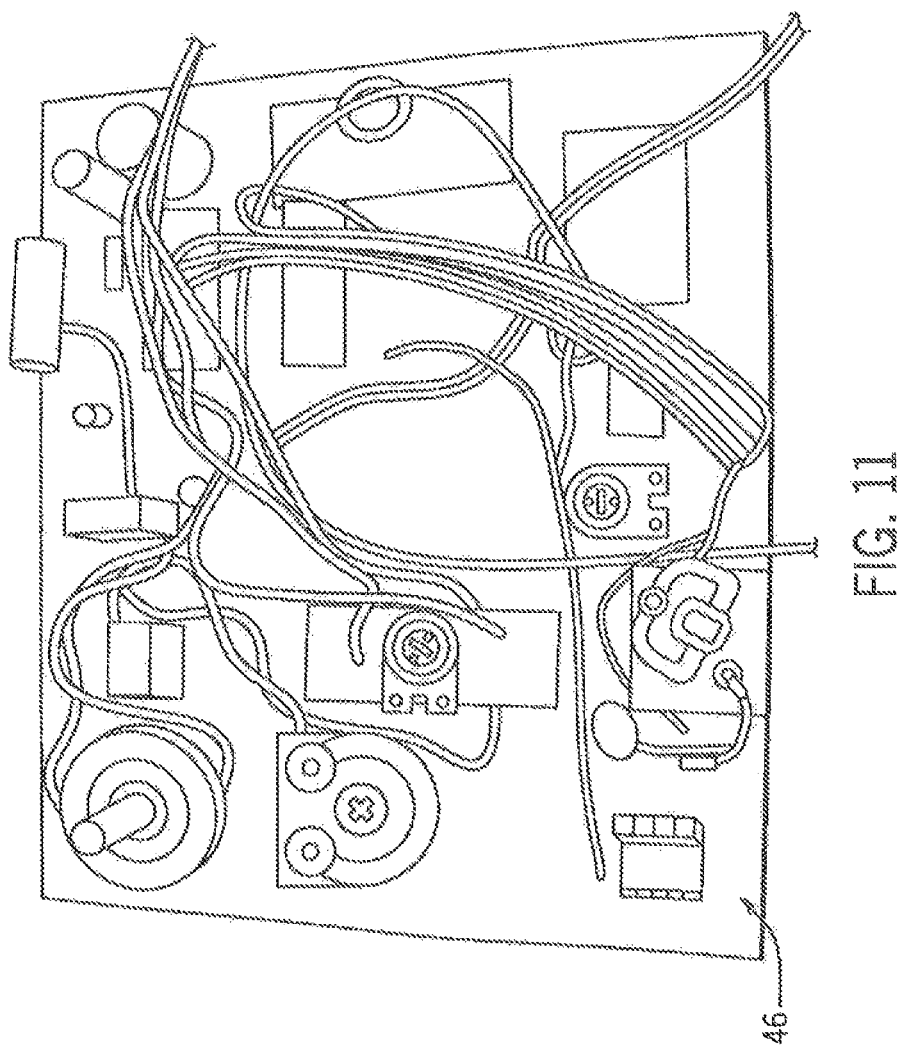
FIG. 11 shows the circuit board inside the base station of FIG. 9 showing the component layout on the circuit board.

The component layout of the circuit board 46 is shown in FIG. 11. To aid in the development process of the circuit design, several trimmer resistors were included throughout the circuitry to allow fine-tuning of operational parameters during field-testing.

Figure 12:
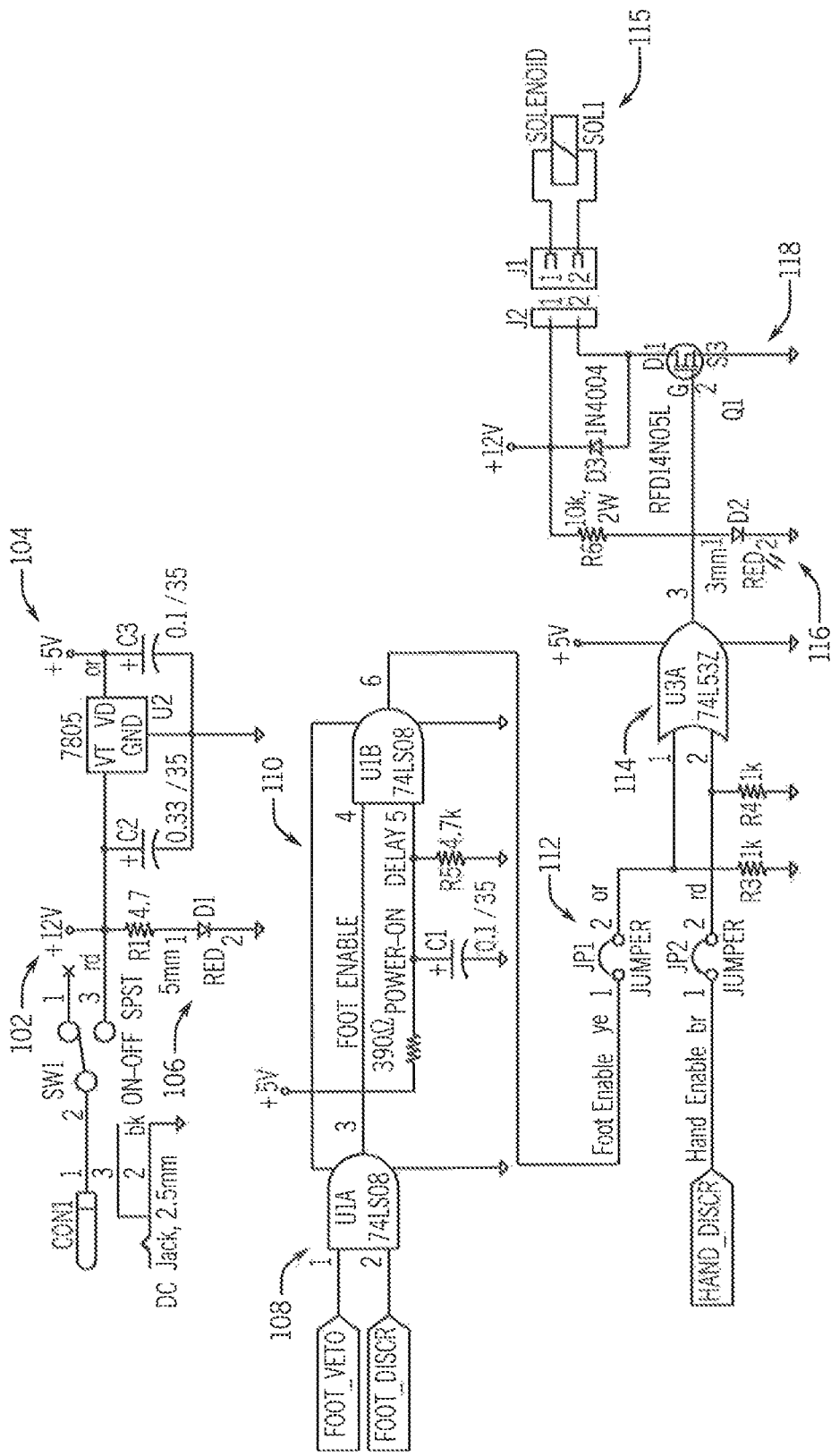
FIG. 12 is a schematic of a power supply, hand logic, foot logic, and air valve driver according to an example embodiment of the disclosure.

A non-limiting example electronic circuit design is shown in the schematics of FIG. 12 through FIG. 15. In the schematic of FIG. 12, the circuit includes: a 12V power supply, uncritical regulated or unregulated 102; a 5V power supply, critical, regulated 104; a panel indicator, on-off 106; foot logic with wireless veto to prevent air valve actuation when the transmitter is turned off 108; foot logic with power-on delay to prevent air valve actuation from an undefined state at start-up 110; hardware disable of hand and/or foot enable signal 112; Ored foot and hand logic 114; an air valve solenoid 115; an air valve solenoid indicator 116; and an air valve solenoid driver circuit 118.

Still referring to FIG. 12, 12 VDC power at 1 A is supplied through a standard 2.5 mm DC jack CON1. The "hard" power switch on the front panel connects or disconnects the entire circuit to this power rail. Downstream from the power switch is an LED power indicator followed by a 5V voltage regulator U2. The unregulated 12V power rail provides power to the solenoid valve Sol1 via the connector J1/J2. The output of the voltage regulator U2 provides voltage-stabilized power to the analog and digital circuits. The air valve is actuated with a driver circuit using a MOSFET switch Q1 in an open-drain configuration. The gate of Q1 is driven directly by an OR gate U3A that ORs the digital signals from the discriminators of the Hand and Foot Enable signals. These signals may be independently disabled in hardware by removing the jumpers JP1 and JP2. The Foot discriminator signal may require a special provision for unwanted switching during transitory conditions such as system Power-On and when the foot transmitter is turned off (no RF carrier resulting in high-frequency FM demodulation artifact). The former can be prevented by a special inverted FOOT_VETO signal ANDed with the regular Foot discriminator signal in gate U1A. The latter is prevented by an RC delay circuit consisting of R2 and C1 with a time constant of $\tau=40$ μs. Both, the delayed Power-On signal and the Foot Enable signal are ANDed in U1B to produce the protected Foot Enable signal. Before Power-On, R5 assures that C1 is fully discharged. At the moment of Power-On, any fast transitory Foot Enable signal will not result in a momentary opening of the air valve because the Power-On Delay signal has not reached it high state yet and thus the output of U1B will remain low. In less than 1 ms after Power-On, all transitory Foot Enable signals have passed and the Power-On Delay signal remains high henceforth, effectively directly connecting the Foot Enable signal to the Foot and Hand Logic OR.

Figure 13:
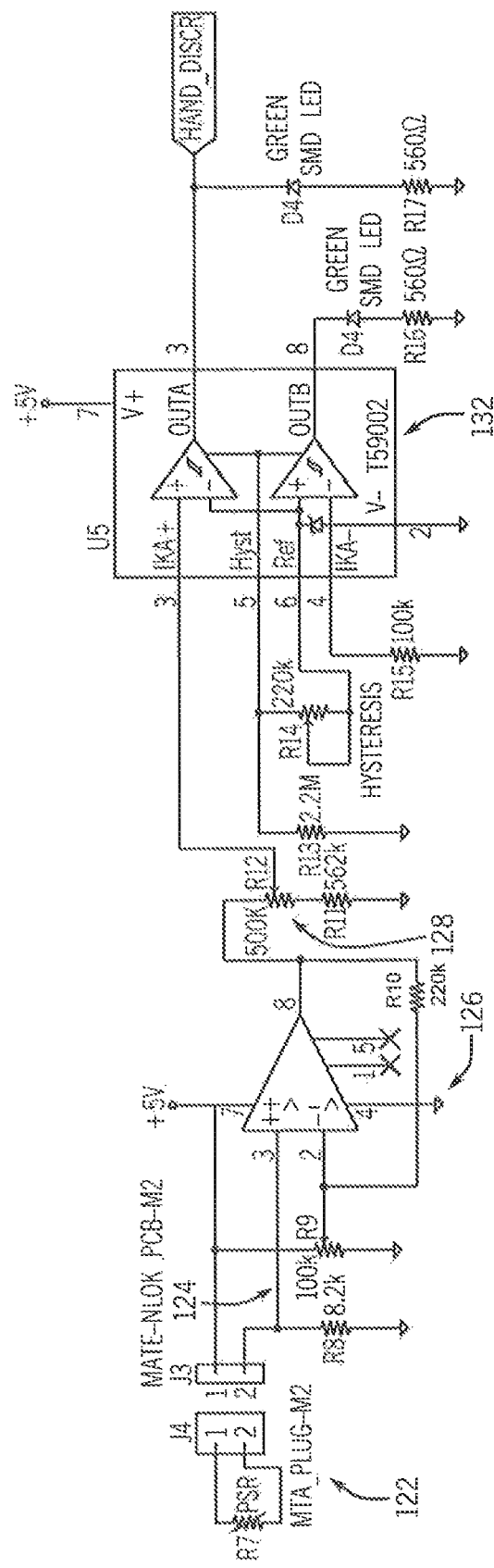
FIG. 13 is a schematic of a signal conditioning of hand pressure sensor and associated threshold discriminator according to an example embodiment of the disclosure.

The circuitry producing the hand discriminator signal HAND_DISC is shown in FIG. 13. In the schematic of FIG. 13, the circuit includes: a pressure-sensitive resistor 122 at the headpiece, idle—10.5 k, full pressure≃6 k; a pre-adjusted lower hand threshold and hysteresis 124; a level transistor (gain≃5×) 126; and a lower hand threshold (on panel) 128; and a threshold discriminator with adjustable hysteresis 132. The pressure-sensitive resistor R7 connects through J3/J4 to a voltage divider circuit consisting of R7 and R8 driven by the stable 5V rail. The dividing point is input into a level translator U4 with 5× gain and pre-adjustable level through R9. The amplified and level-adjusted output is voltage-divided with the R11/R12 resistor circuit with R12 being the Hand Sensor Sensitivity potentiometer on the front panel of the electronics box. The slider of R12 feeds the input of a special threshold discriminator U5 with adjustable hysteresis through R11. Both outputs of U5, OUTA and OUTB, have LED indicators connected to them for development purposes. At terminal OUTA, the HAND_DISCR signal is available.

Figure 14:
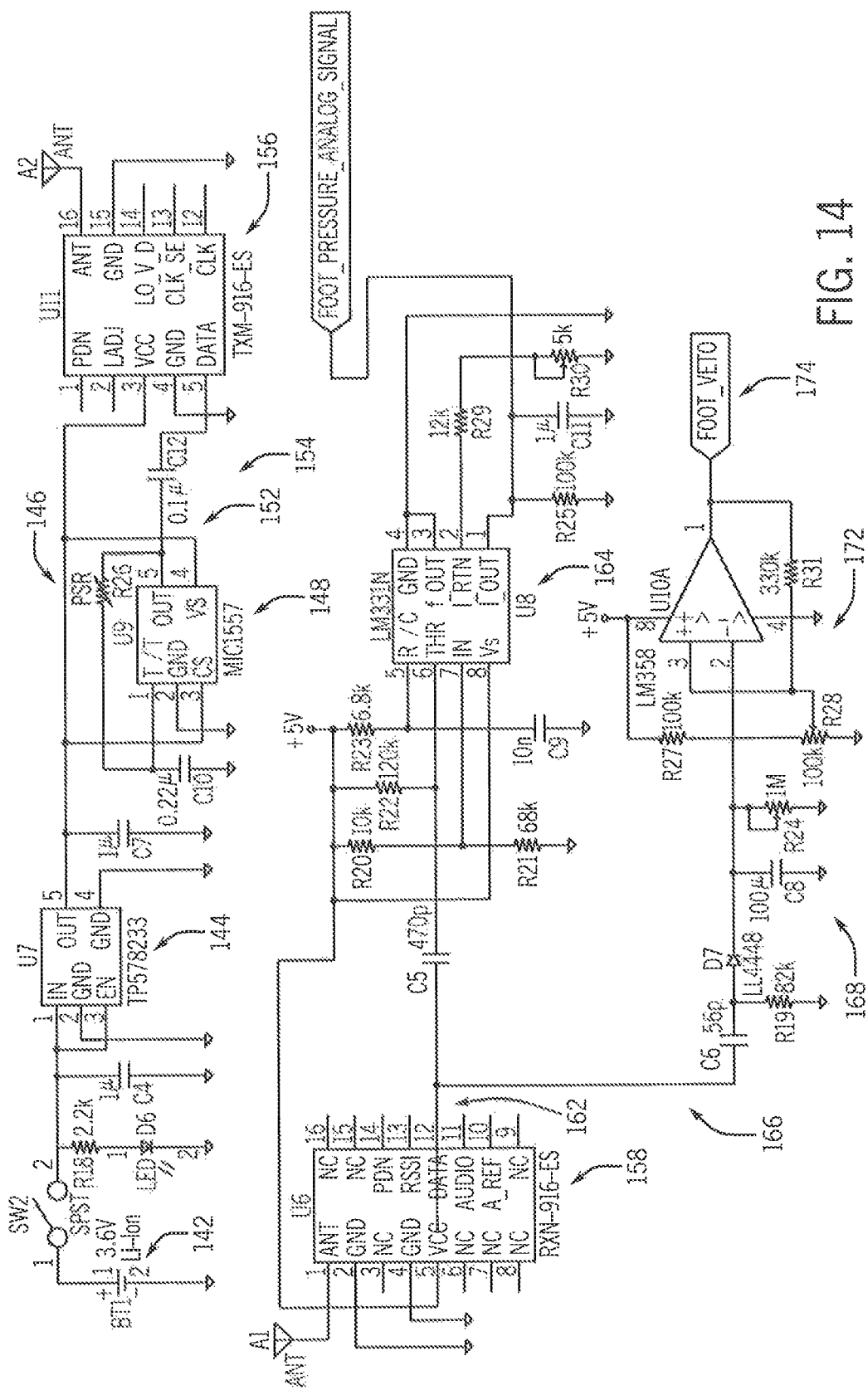
FIG. 14 is a schematic of a signal conditioning of a transmitter, receiver, demodulator, and veto safety circuit according to an example embodiment of the disclosure.

The circuits related to a non-limiting example foot switch are shown in FIG. 14. In the schematic of FIG. 14, the circuit includes: a rechargeable button cell CR2450 110 mAh 142; a low-dropout voltage regulator 144 to supply stable voltage to data generation circuitry independent of battery charge state; a pressure-sensitive resistor 146 at shoe tips, idle≃5 kΩ, full pressure≃500Ω; a resistance-to-frequency converter 148; square wave serial data modulation 152 (<kHz, 50% duty); serial data generation 154, PSR idle≃1.5 kHz, PSR full pressure≃14 kHz; an FM transmitter 156; an FM receiver 158; wherein at 162, when TX is on: square wave demodulated serial data (F<15 kHz); a frequency-to-voltage converter 164; wherein at 166, when TX is off: square wave white noise, no modulation (f>50 kHz); a high-pass filter plus buffered rectifier 168 producing a DC signal proportional to frequency wherein high-frequency white noise produces a substantially larger DC voltage when TX is off compared to when TX is on and frequency is <15 kHz wherein this signal is used to generate a veto signal to prevent air valve from opening when TX is off; a Schmitt-trigger 172 to create a digital veto signal from analog DC voltage of the high-pass filter; and wherein at 174, when TX on, V≃3.84V and when TX is off, V≃0.02V.

Still referring to FIG. 14, the circuits can be divided into those of the transmitter located at the tip of the dental practitioner's shoe and those of the receiver located in the base station. Beginning with the former, the coin battery BT1 supplies the entire transmitter circuit with 3.6V unregulated power through a "hard" switch SW2. D6 is a red LED indicator that is lit during the Power-On state and helps the operator to clearly see if the device is powered on or off so not to accidentally discharge the battery needlessly. The battery voltage is downregulated to 3.3V with the voltage regulator U7, which supplies the resistance-to-frequency converter and FM transmitter ICs. The pressure-sensitive resistor R26 connects directly to terminals 1 and 5 of the resistance-to-frequency converter U9. This IC outputs a square wave of <15 kHz at 50% duty cycle, which actually varies between 1.5 kHz and 14 kHz, depending on whether the pressure sensor is subjected to "full pressure" (highest expected pressure from the dental practitioner's foot) or no pressure, respectively. This square wave is used as modulation for the FM transmitter, not unlike the frequency-shift-keying (FSK) modulation mode. The FM transmitter comprises a single IC U11 that takes the modulation signal through a blocking capacitor C12 and outputs the FM-modulated 900 MHz carrier wave through the antenna A2. The FM-modulated wireless signal interference is secure from interference from other wireless signals.

The base station receives this signal though the whip antenna A1 mounted on top of the metal enclosure of the electronics box. A1 connects directly to the single IC FM receiver U6, which outputs the FM-demodulated signal on its DATA port at pin 12. Significantly, when the transmitter is powered-on, the demodulated signal will be a square wave between 1.5 kHz and 14 kHz.

However, if the transmitter is powered-off, there is no clear demodulated signal and the DATA port outputs white noise of a frequency greater than 50 kHz. This situation poses a problem because during normal operation the variable square wave is processed in the frequency-to-voltage converter U8 to generate the FOOT_PRESSURE_ANALOG_SIGNAL used in the Foot discriminator. Therefore, if a 50 kHz signal is presented to U8 it will generate a high voltage output, which the discriminator will interpret as "full pressure", even though the transmitter is powered-off. To veto this condition, the DATA port output of U6 is split into a high-pass filter comprising C6 and R19 with a time constant of $\tau=5$ µs followed by a rectifier D7 and filter C8. The RC high-pass has a high input impedance so the adjustable load resistor R24 puts an effective clamp on the rectified voltage without undue load on the DATA signal itself. When R24 is properly adjusted, the voltage input into the Schmitt-trigger U10A at pin 2 is reliably <0.80 V when the transmitter is powered-on and rises to 1.16 V when the transmitter is powered-off. The difference in these voltages is used to extract with certainty the information whether the transmitter is powered-on or powered-off. The Schmitt-trigger U10A, when properly adjusted with the level adjuster R28, produces a reliable FOOT_VETO signal when the transmitter is powered off.

Figure 15:
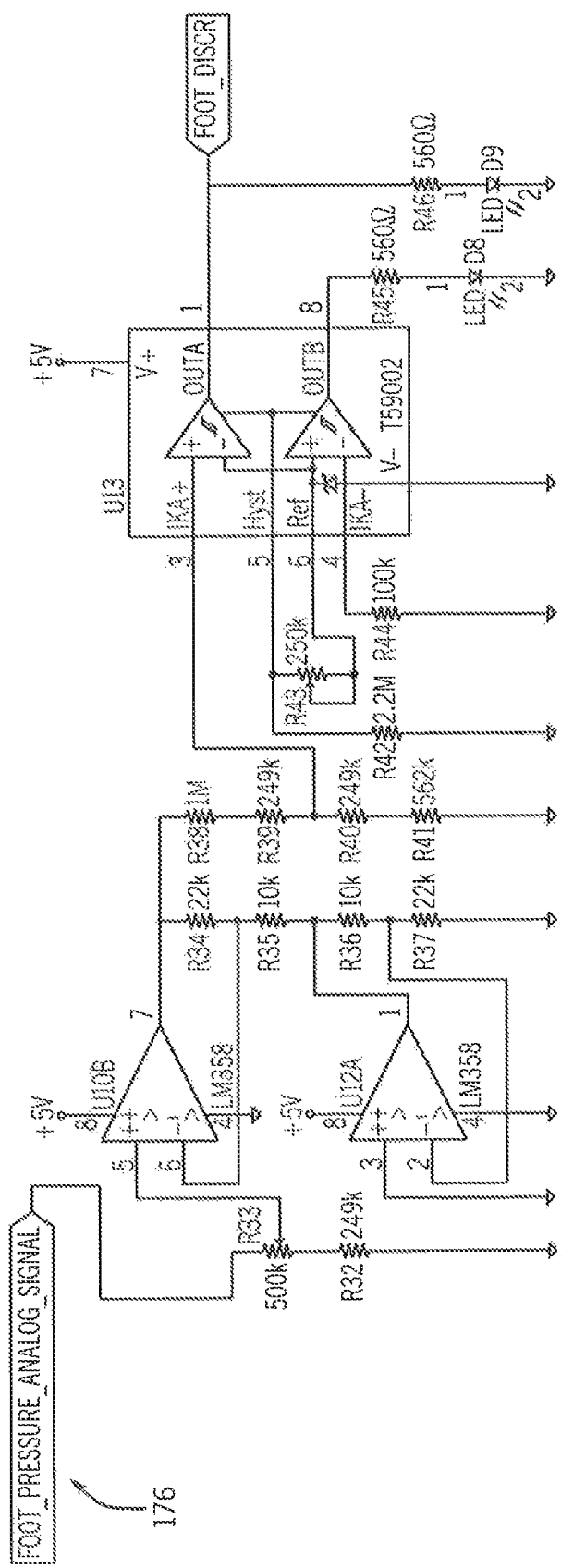
FIG. 15 is a schematic of a foot pressure signal discriminator according to an example embodiment of the disclosure.

The FOOT_PRESSURE_ANALOG_SIGNAL is processed and converted into the foot discriminator signal FOOT_DISCR with the circuit shown in FIG. 15. In the schematic of FIG. 15, at 176, when the foot is off the ground, the voltage=0.4V; when the foot is resting on the front sole, the voltage=1.0V; when there is a fully tilted foot (=30°) and no pressure, the voltage≃2.9V, and when there is a fully tilted foot (=30°) and full pressure, the voltage≃=3.6V. The signal is voltage-divided and level-adjusted by resistors R32 and R33 with the latter being the Foot Sensor Sensitivity control potentiometer on the front panel of the electronics box. The level-adjusted FOOT_PRESSURE_ANALOG_SIGNAL is input into a 2-operational amplifier instrumentation amplifier consisting of U10B and U12A with a gain of 3×. The output at pin 7 of U10B is voltage-divided by a fixed resistor series network consisting of R38, R39, R40 and R41. The divided signal is tapped between R39 and R40 and is input into the discriminator circuit U13 with R43 being a hysteresis adjustment. The states of both outputs OUTA and OUTB at pin1 and pin8, respectively, are indicated by LEDs D8 and D9 to aid in the development process. The FOOT_DISCR signal is output OUTA available at pin1.

Figure 16:
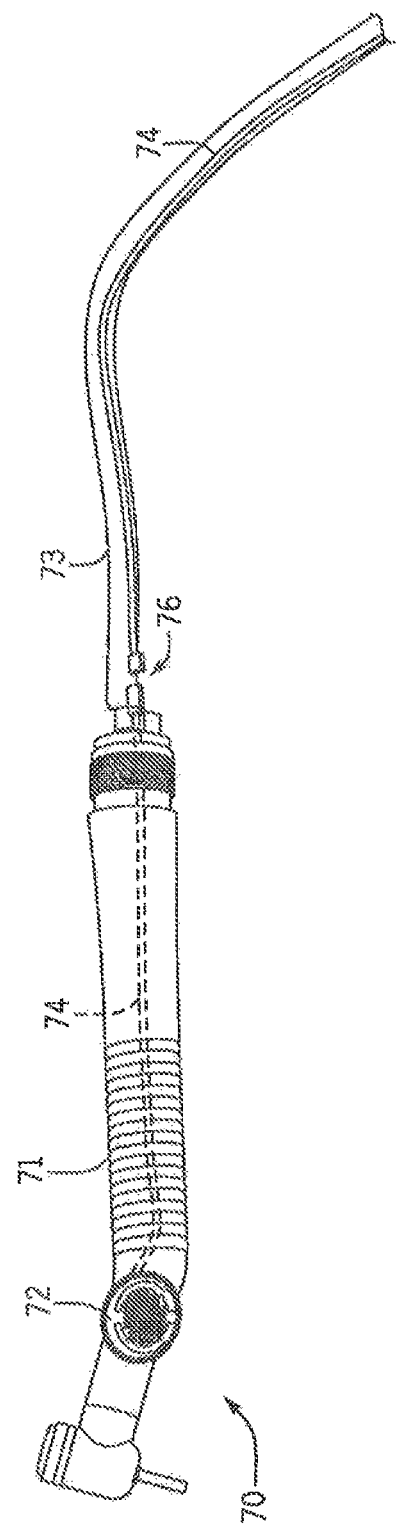
FIG. 16 shows a schematic depiction of a dental handpiece for dexterous operability with hand and foot actuation according to another example embodiment of the disclosure.

Turning now to FIG. 16, another embodiment of a handpiece 70 is shown. The handpiece 70 incorporates a pressure sensor 72 and supply lines 74 into the handpiece housing 71 and an umbilical 73 extending from a distal end of the handpiece 70. One advantage of this design is that the sensor and wiring is protected and no exterior surfaces (i.e., the sensor element, wiring and electrical connector) are added to the system that may get contaminated. Cleaning and disinfection of the exterior of the handpiece 70 may be simplified and the handpiece 70 may be autoclaved without having to remove the sensor 72 and associated supply lines 74 beforehand. The sensor 72, supply lines 74 and electrical connector 76 are schematically shown half-transparent to indicate their location inside the handpiece 70 and inside a lumen of the umbilical 73. The function of the components remains the same as with the embodiment that has the sensor 22, cable 24 and connector 25 attached externally to the handpiece 20 and lumen 28.

Figure 17B:
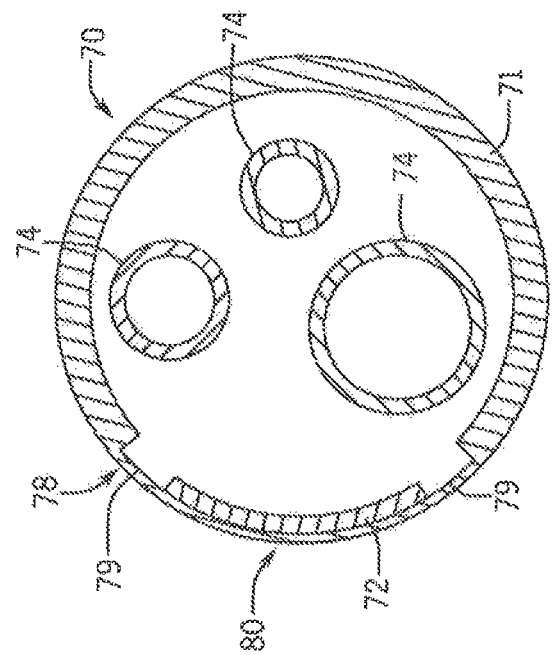
FIGS. 17A and 17B show a schematic depiction of a dental handpiece for dexterous operability with hand and foot actuation and a cross-sectional view along the line 17B-17B respectively, according to another example embodiment of the disclosure.
Figure 17A:
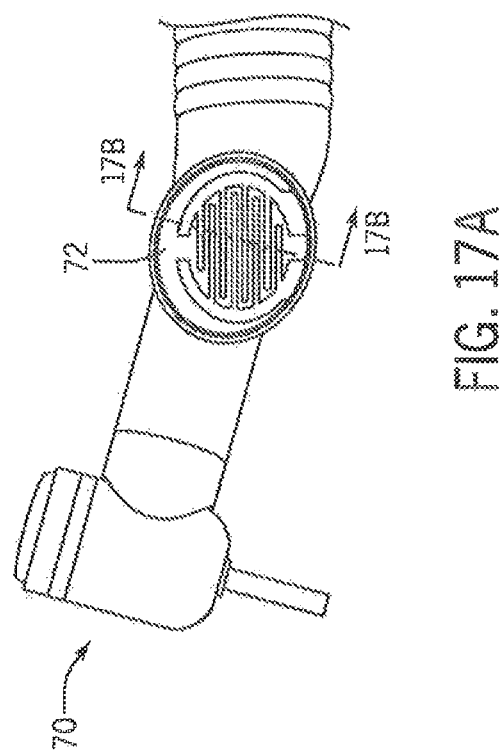

Turning now to FIGS. 17A and 17B, in order to facilitate a mechanical means of transmitting the finger pressure of the physician to the pressure sensor 72 located in the interior of the handpiece 70, a section of the handpiece housing 71 has a thin-walled section 78 to the extent that normal finger pressure will deform the thin-walled section 78 of the housing. The thin-walled section 78 is preferably shaped such that it accommodates the shape of the pressure sensor 72, specifically its sensitive area. In FIGS. 17A and 17B, the sensor 72 is shown as having a circular, disc-like shape. In such a case, the thin-walled section 78 of the handpiece housing 71 is also generally circular in shape in order to accommodate the shape of the sensor 72. As illustrated in FIG. 17B, the pressure sensor 72 is bonded to the thin-walled section 78 on an interior surface of the handpiece housing 71. There is a small gap 79 between the edge of the sensor 72 and the end of the thin-walled section 78 such that a deformation of the thin-walled section 78 does not push the sensor 72 against the portion of the handpiece housing 71 that is not thinned-out.

The thickness of the thin-walled section 78 is determined by the optimal finger pressure profile and also the optimal deformation for the bonded sensor 72. In a preferred embodiment, the wall thickness of the thin-walled section 78 is thin enough to cause a suitable deformation at comfortable finger pressure and at the same time thick enough to retain the ruggedness of the handpiece 70. The thin-walled section 78 of the handpiece housing may be configured as a plug that can be inserted into the handpiece 70 and preferably being situated flush with the exterior of handpiece housing 71. This configuration would allow optimization of the pressure area 80 in combination with the sensor 72 bonded to it.

Turning now to FIGS. 18A and 18B, another embodiment of the handpiece 70 is shown with the supply lines 74 and electrical wiring 75 positioned inside the handpiece housing 71 and the umbilical 73. The electrical connector 76 shown in FIG. 16 is replaced with a pair of stationary connector pads 82 on distal face 84 of the handpiece 70 and a mating pair of spring-loaded contact bumps 86 on the proximal face 88 of the umbilical 73. The supply lines 74 (which may include air, water, and fiber optic light guide, among others) include protruding line sections 90 that mate with receptacles 92 positioned within the umbilical 73 configured to create a sealed connection between the receptacles 92 and protruding line sections 90 thereby creating continuous supply lines 74 when the connection is made.

The stationary connector pads 82 may be located on the distal face 84 of the handpiece 70 in order to embed the connector pads 82 into the distal face 84 of the handpiece 70 and thereby permanently sealed in place. If the connector pads 82 are inserted flush with the distal face 84 of the handpiece 70 then the cleaning and disinfection process is simplified because no crevices are created where access to disinfectant or mechanical cleaning might be impeded.

To facilitate reliable electrical connection and allow some relative movement between the handpiece 70 and the umbilical 73 during operation, the mating connections of the stationary connector pads 82 are made as spring-loaded contact bumps 86. The spring-loading travel and force is determined by the degree of relative movement that needs to be accommodated while still maintaining reliable electrical connection between the stationary contact pads 82 and the spring loaded contact bumps 86.

The contact bumps 86 may be spring-loaded with an actual coil or leaf spring or an elastomeric material. These materials may produce a smooth transition from the contact bumps 86 to the proximal face 88 of the umbilical 73 avoiding any crevices in the mechanism that might make disinfection and cleaning more difficult.

Figure 19:
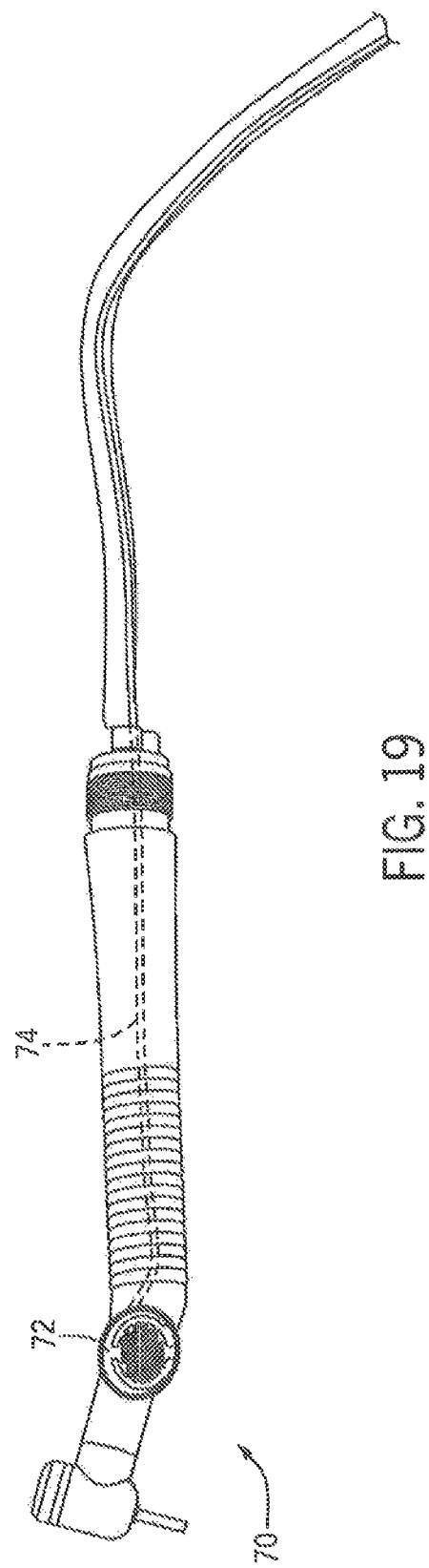
FIG. 19 shows a schematic depiction of a dental handpiece for dexterous operability with hand and foot actuation according to another example embodiment of the disclosure.

Turning now to FIGS. 19, 20A, and 20B, another embodiment of the handpiece 70 is shown. The handpiece 70 is modified to have a contact-less quick-disconnect that replaces the electrical connector 76. The above disclosed stationary connector pads 82 and contact bumps 86 can be expected to be a rugged and reliable method for electrical contact.

Another embodiment that may increase the service life of the system by incorporating electromagnetic communication between the sensor inside the handpiece and the control unit is disclosed. FIG. 20B shows the location of the contact-less electromagnetic communication and unique device identifying protocol interface 95 at the same location as the previously-described connector pads 82 and contact bumps 86.

The supply lines 74 (which may include air, water, and fiber optic light guide, among others) remain the same as described above. However, the contact pads 82 on the distal face 84 of the handpiece 70 as well as the contact bumps 86 on the proximal face 88 of the umbilical 73 are replaced with a transmitter coil 96 just behind the distal face 84 of the handpiece 70 such that it may be adjacent to and/or abut with the inside wall of the handpiece body 71 at the distal face 84, and a receiver coil 98 umbilical just behind the proximal face 88 of the umbilical 73 such that it may be adjacent to and/or abut with the inside wall of the umbilical 73 at the proximal face 88. When the umbilical 73 is connected to the handpiece 70, the transmitter coil 96 and the receiver coil 98 are positioned in close proximity, which affords a tight electromagnetic coupling. This tight electromagnetic coupling enables efficient energy and/or information transfer between the circuit inside the handpiece 70 and the circuit in the controller unit (not shown).

The controller unit can perform a number of functions, one non-limiting example of which is the interruption/control of a fluid flow through the supply lines 74. The controller unit can control one or more fluids flowing through the supply lines 74 that can serve a number of purposes, including but not limited to: driving the handpiece 70 if the handpiece 70 includes a drill, for example, pumping fluid through the supply lines 74 to be administered though the handpiece 70, guiding light for illumination through light guides, among other things.

According to some embodiments, the handpiece 70 may be in fluid communication with a metering valve, A source of fluid may be in fluid communication with the metering valve, and a controller may be in electrical communication with the metering valve and an actuating sensor positioned on the handpiece. The actuating sensor may be configured to cause the metering valve to move between a first position in which fluid cannot flow from the source of fluid to the handpiece and a second position in which fluid flows freely from the source of fluid to the handpiece and between one or more intermediate positions where the fluid flows more or less freely thereby driving the handpiece at different speeds. The dental instrument may further comprise a second actuating sensor in communication with the controller. The second actuating sensor may be configured to cause the metering valve to move between the first position in which fluid cannot flow from the source of fluid to the handpiece and the second position in which fluid flows freely from the source of fluid to the handpiece and between one or more intermediate positions where the fluid flows more or less freely thereby driving the handpiece at different speeds. The metering valve may provide intermediary speed between full-on and full-off by having as opposed to the use of an on-off valve. The metering valve may be driven by an analog signal produced any way by the actuation sensors.

One advantage of the use of the contact-less electromagnetic communication interface 95 is that all electrical components, including electrical wiring 75 and connections, are maintained within a closed volume of the handpiece 70 or the umbilical 73. Therefore, there are no electrical contacts to corrode or erode and no protrusions or indentations that might potentially create crevices making disinfection and cleaning difficult. The distal face 84 of the handpiece 70 and the proximal face 88 of the umbilical 73 can be made of a smooth surface from the same material as the handpiece 70 or umbilical 73. This simplifies the manufacturing process and makes the system more rugged and reliable.

The method used to communicate changes in the pressure sensor 72 parameter, which reflects the finger pressure applied by the physician, may be an alternating current probing the impedance of the sensing element of the pressure sensor 72. More precise pressure sensors may be desired, and more precise pressure measurement can be achieved using a combination of sensing element and an analog front-end along with a signal processing and communication stage. In this case, the contact-less electromagnetic communication interface 95 can be used to supply electrical energy, which is then harvested and rectified to supply the circuits. Information is transferred back to the controller unit either by a protocol that "listens" to the sensor circuits, which at the appropriate time transmit information. Alternatively, the sensor circuit might use an impedance modulation of the load attached to the receiver coil and thereby communicate back to the controller circuits.

Figure 21:
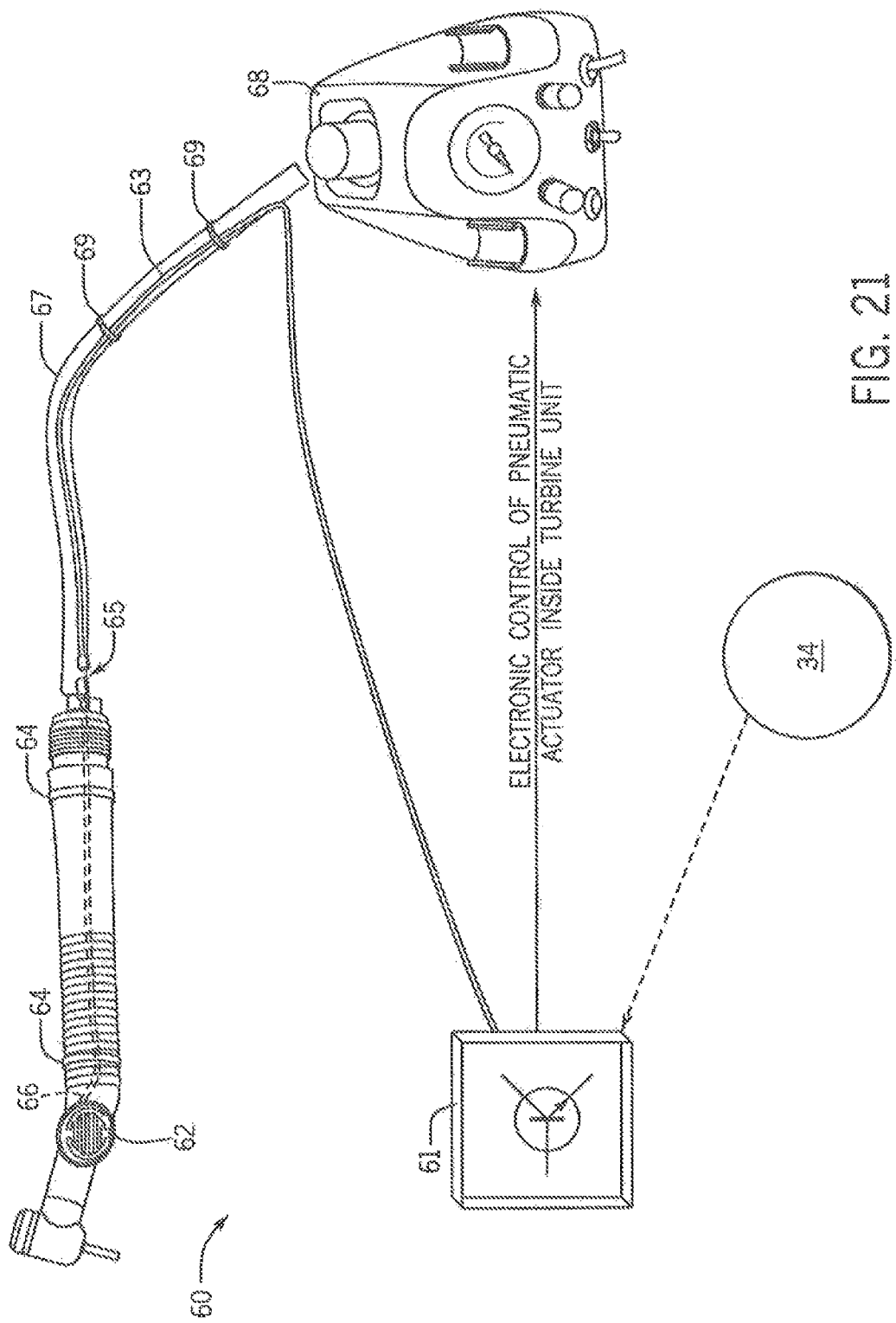
FIG. 21 shows a schematic depiction of a dental handpiece for dexterous operability with hand and foot actuation according to another example embodiment of the disclosure.

Turning now to FIG. 21, there is shown a dental handpiece 60 for dexterous operability with hand and foot actuation according to another example embodiment of the disclosure. A thin-film pressure sensor 62 is positioned on the dental handpiece 60. Temporary retainer clips 64 on the handpiece 60 secure a first electrical wire 66 that is in electrical communication with the thin-film pressure sensor 62 and a splash-proof quick-disconnect 65. Air tubing 67 is in fluid communication with a turbine unit 68. Permanent retainer clips 69 secure to the air tubing 67 a second electrical wire 63 that is in electrical communication with the splash-proof quick-disconnect 65 and the control electronics 61. The control electronics 61 provide electronic control of a pneumatic actuator inside turbine unit 68. A wireless toe or heel sensor as in FIG. 7 is in wireless communication with the control electronics 61. The wireless communication may be using a secure wireless communication protocol such as IEEE 802.11 a/b/g/n using encryption for security and safety.

It is to be appreciated that according to any of the above-described embodiments of this disclosure, a number of features and/or advantages are present. First, dexterous or foot control is fully incorporated in the described handpiece designs. Second, the clip-on attachment(s) described to be placed on the handpiece are sterile and the handpiece can be sterilized. Additionally, isolated-stand-alone control circuits incorporating layered analog/digital logic can be implemented. Additional electronic logic circuitry may be implemented to avoid accidental operation of the handpiece. The operation of the handpiece can be achieved through pressure switch (via the user's hand) or a foot switch (via foot activation via a foot-sock), or both. The operation of the handpiece can also be achieved through pressure sensors (via the user's hand) or a foot sensor (via foot activation via a foot-sock), or both. These sensors can be configured to generate an analog signal that is transmitted wired or wirelessly to the controller, which then transmits an appropriate signal to a proportional actuator, such as a valve with controllable orifice, for example a needle valve. In this configuration the practitioner may control certain operating parameters of the handpiece proportionally to the finger or toe or heel pressure exerted.

Thus, the disclosure provides a dental handpiece for dexterous operability with hand and foot actuation.

Although the disclosure has been described in considerable detail with reference to certain embodiments, one skilled in the art will appreciate that the present disclosure can be practiced by other than the described embodiments, which have been presented for purposes of illustration and not of limitation. Therefore, the scope of the appended claims should not be limited to the description of the embodiments contained herein.

What is claimed is:

1. A dental instrument comprising:
a fluid driven handpiece in fluid communication with a valve;
a source of fluid in fluid communication with the valve;
a controller in electrical communication with the valve and a first sensor positioned on the handpiece,
wherein the first sensor is configured to cause the valve to move between a first position in which fluid cannot flow from the source of fluid to the handpiece and a second position in which fluid flows from the source of fluid to the handpiece thereby driving the handpiece, and
a second sensor in communication with the controller, the second sensor being configured to cause the valve to move between the first position in which fluid cannot flow from the source of fluid to the handpiece and the second position in which fluid flows from the source of fluid to the handpiece thereby driving the handpiece,
wherein the second sensor is attached to a cover for slipping over a shoe, and
wherein the second sensor comprises a pressure-sensitive resistor, and
wherein the valve is a proportional actuator driven by an analog signal from the pressure-sensitive resistor, and the controller is configured to open the valve proportionally to toe or heel pressure exerted on the second sensor,
wherein the controller includes a veto safety circuit that generates a digital veto signal from the analog signal from the pressure-sensitive resistor, wherein the digital veto signal prevents actuation of the valve when a transmitter of the second sensor is powered off by preventing connection of an enable signal to a driver circuit of the valve.

2. The dental instrument of claim 1 wherein:
the first sensor is configured to cause the valve to move between one or more additional positions intermediate the first position and the second position such that the fluid flows at different speeds thereby driving the handpiece at different speeds.

3. The dental instrument of claim 2 wherein:
the valve is a metering valve in fluid communication with the fluid driven handpiece, the first sensor being configured to cause the metering valve to move to the one or more additional positions.

4. The dental instrument of claim 1 further comprising:
one or more supply lines and one or more electrical wires positioned within the fluid driven handpiece;
an umbilical configured to receive one or more supply lines and one or more electrical wires, the umbilical selectively attachable to a distal end of the fluid driven handpiece;
wherein the one or more supply lines and one or more electrical wires of the fluid driven handpiece are selectively attachable to the one or more supply lines and one or more electrical wires of the umbilical.

5. The dental instrument of claim 4 wherein:
the one or more electrical wires of the fluid driven handpiece are selectively attachable to the one more electrical wires of the umbilical via stationary contact pads on a distal face of the fluid driven handpiece and contact bumps on a proximal face of the umbilical.

6. The dental instrument of claim 4 wherein:
the one or more electrical wires of the fluid driven handpiece are selectively attachable to the one more electrical wires of the umbilical via a transmitter coil of the fluid driven handpiece and a receiver coil of the umbilical.

7. The dental instrument of claim 1 wherein:
the second sensor is in wireless communication with the controller.

8. The dental instrument of claim 7 wherein:
the wireless communication is encrypted.

9. The dental instrument of claim 1 wherein:
the cover is dimensioned to be secured to a toe of a shoe.

10. The dental instrument of claim 1 wherein:
the cover is dimensioned to be secured to a heel of a shoe.

11. The dental instrument of claim 1 wherein:
the second sensor comprises a wireless device that comprises the pressure-sensitive resistor in electrical communication with the transmitter.

12. The dental instrument of claim 1 wherein:
the controller includes a foot discriminator circuit that generates a foot discriminator signal from the analog signal from the pressure-sensitive resistor, wherein the foot discriminator signal is ANDed with the digital veto signal in a gate that enables connection of the enable signal to the driver circuit of the valve.

13. The dental instrument of claim 1 wherein:
the second sensor comprises a vibratory feedback device for indicating activation of the sensor by a user.

14. The dental instrument of claim 1 wherein:
the controller includes a delay circuit that prevents actuation of the valve at start-up by delaying connection of the enable signal to the driver circuit of the valve.

15. The dental instrument of claim 1 wherein:
the valve comprises a controllable orifice.

16. The dental instrument of claim 1 wherein:
the second sensor comprises a combination of the pressure-sensitive resistor and an analog front-end along with a signal processing and communication stage.

17. A dental instrument comprising:
a fluid driven handpiece in fluid communication with a valve;
a source of fluid in fluid communication with the valve;
a controller in electrical communication with the valve and a sensor,
wherein the sensor comprises a wireless device attached to a cover for slipping over a shoe,
wherein the sensor is configured to cause the valve to move between a first position in which fluid cannot flow from the source of fluid to the handpiece and a second position in which fluid flows from the source of fluid to the handpiece thereby driving the handpiece, and wherein the sensor comprises a vibratory feedback device for indicating activation of the sensor by a user, and wherein the sensor comprises a pressure-sensitive resistor, wherein the valve is a proportional actuator driven by an analog signal from the pressure-sensitive resistor, and the controller is configured to open the valve proportionally to toe or heel pressure exerted on the sensor, wherein the controller includes a veto safety circuit that generates a digital veto signal from the analog signal from the pressure-sensitive resistor, wherein the digital veto signal prevents actuation of the valve when a transmitter of the sensor is powered off by preventing connection of an enable signal to a driver circuit of the valve.

18. The dental instrument of claim 17 wherein:
the sensor is configured to cause the valve to move between one or more additional positions intermediate the first position and the second position such that the fluid flows at different speeds thereby driving the handpiece at different speeds.

19. The dental instrument of claim 18 wherein: the valve is a metering valve in fluid communication with the fluid driven handpiece, the sensor being configured to cause the metering valve to move to the one or more additional positions.

20. The dental instrument of claim 17 wherein:
the wireless device is in electrical communication with the transmitter.

21. The dental instrument of claim 17 further comprising:
a second sensor in communication with the controller, the second sensor being configured to cause the valve to move between the first position in which fluid cannot flow from the source of fluid to the handpiece and the second position in which fluid flows from the source of fluid to the handpiece thereby driving the handpiece.

22. The dental instrument of claim 17 further comprising:
one or more supply lines and one or more electrical wires positioned within the fluid driven handpiece;
an umbilical configured to receive one or more supply lines and one or more electrical wires, the umbilical selectively attachable to a distal end of the fluid driven handpiece;
wherein the one or more supply lines and one or more electrical wires of the fluid driven handpiece are selectively attachable to the one or more supply lines and one or more electrical wires of the umbilical.

23. The dental instrument of claim 22 wherein:
the one or more electrical wires of the fluid driven handpiece are selectively attachable to the one more electrical wires of the umbilical via stationary contact pads on a distal face of the fluid driven handpiece and contact bumps on a proximal face of the umbilical.

24. The dental instrument of claim 22 wherein:
the one or more electrical wires of the fluid driven handpiece are selectively attachable to the one more electrical wires of the umbilical via a transmitter coil of the fluid driven handpiece and a receiver coil of the umbilical.

25. The dental instrument of claim 17 wherein:
the sensor is in wireless communication with the controller.

26. The dental instrument of claim 25 wherein:
the wireless communication is encrypted.

27. The dental instrument of claim 17 wherein:
the cover is dimensioned to be secured to a toe of a shoe.

28. The dental instrument of claim 27 wherein:
the wireless device is in electrical communication with the transmitter.

29. The dental instrument of claim 17 wherein:
the controller includes a foot discriminator circuit that generates a foot discriminator signal from the analog signal from the pressure-sensitive resistor, wherein the foot discriminator signal is ANDed with the digital veto signal in a gate that enables connection of the enable signal to the driver circuit of the valve.

30. The dental instrument of claim 17 wherein:
the controller includes a delay circuit that prevents actuation of the valve at start-up by delaying connection of the enable signal to the driver circuit of the valve.

31. A dental instrument comprising:
a fluid driven handpiece in fluid communication with a valve;
a source of fluid in fluid communication with the valve;
a controller in electrical communication with the valve and a first sensor positioned on the handpiece;
a second sensor in communication with the controller, the second sensor being configured to cause the valve to move between a first position in which fluid cannot flow from the source of fluid to the handpiece and a second position in which fluid flows from the source of fluid to the handpiece thereby driving the handpiece, wherein the second sensor is attached to a cover for slipping over a shoe, wherein the second sensor comprises a pressure-sensitive resistor;
one or more supply lines and one or more electrical wires positioned within the fluid driven handpiece;
an umbilical configured to receive one or more supply lines and one or more electrical wires, the umbilical selectively attachable to a distal end of the fluid driven handpiece;
wherein the controller electromechanically controls an actuator of the valve, the actuator is configured to cause the valve to move between the first position in which fluid cannot flow from the source of fluid to the handpiece and the second position in which fluid flows from the source of fluid to the handpiece thereby driving the handpiece;
wherein the one or more supply lines and one or more electrical wires of the fluid driven handpiece are selectively attachable to the one or more supply lines and one or more electrical wires of the umbilical,
wherein the valve is a proportional actuator driven by an analog signal from the pressure-sensitive resistor, and the controller is configured to open the valve proportionally to toe or heel pressure exerted on the second sensor, and
wherein the controller includes a veto safety circuit that generates a digital veto signal from the analog signal from the pressure-sensitive resistor, wherein the digital veto signal prevents actuation of the valve when a transmitter of the second sensor is powered off by preventing connection of an enable signal to a driver circuit of the valve.

32. The dental instrument of claim 31 wherein:
the actuator of the valve is a solenoid coil that actuates the valve.

33. The dental instrument of claim 31 wherein:
the first sensor is configured to cause the valve to move between one or more additional positions intermediate the first position and the second position such that the fluid flows at different speeds thereby driving the handpiece at different speeds.

34. The dental instrument of claim 31 wherein:
the cover is dimensioned to be secured to a toe of a shoe.

35. The dental instrument of claim 31 wherein:
the controller includes a foot discriminator circuit that generates a foot discriminator signal from the analog signal from the pressure-sensitive resistor, wherein the foot discriminator signal is ANDed with the digital veto signal in a gate that enables connection of the enable signal to the driver circuit of the valve.

36. The dental instrument of claim 31 wherein:
the controller includes a delay circuit that prevents actuation of the valve at start-up by delaying connection of the enable signal to the driver circuit of the valve.

* * * * *

UNITED STATES PATENT AND TRADEMARK OFFICE
CERTIFICATE OF CORRECTION

| | |
|---|---|
| PATENT NO. | : 12,023,211 B2 |
| APPLICATION NO. | : 16/060650 |
| DATED | : July 2, 2024 |
| INVENTOR(S) | : Inder Raj S. Makin et al. |

It is certified that error appears in the above-identified patent and that said Letters Patent is hereby corrected as shown below:

In the Specification

Column 8, Line 10, "R11" should be --R14--.

Signed and Sealed this
Eighth Day of October, 2024

Katherine Kelly Vidal
*Director of the United States Patent and Trademark Office*